United States Patent
Wang et al.

(10) Patent No.: US 10,769,592 B1
(45) Date of Patent: Sep. 8, 2020

(54) METHODS, SYSTEMS AND COMPUTER PROGRAM PRODUCTS FOR GENERATING EXPLANATIONS FOR A BENEFIT QUALIFICATION CHANGE

(71) Applicant: INTUIT INC., Mountain View, CA (US)

(72) Inventors: Gang Wang, San Diego, CA (US); Kevin M. McCluskey, Carlsbad, CA (US); Gregory W. Miller, San Diego, CA (US); Arien C. Ferrell, Sunnyvale, CA (US); Michael J. Graves, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 364 days.

(21) Appl. No.: 15/221,520

(22) Filed: Jul. 27, 2016

(51) Int. Cl.
*G06Q 40/08* (2012.01)
*G06Q 10/10* (2012.01)

(52) U.S. Cl.
CPC ......... *G06Q 10/1057* (2013.01); *G06Q 40/08* (2013.01)

(58) Field of Classification Search
USPC .......................................... 705/322
See application file for complete search history.

(56) References Cited

U.S. PATENT DOCUMENTS

| | | |
|---|---|---|
| 4,213,251 A | 7/1980 | Foundos |
| 4,809,219 A | 2/1989 | Ashford et al. |
| 5,006,998 A | 4/1991 | Yasunobu |
| 5,495,607 A | 2/1996 | Pisello et al. |

(Continued)

FOREIGN PATENT DOCUMENTS

| | | | |
|---|---|---|---|
| JP | 2002-117121 A | 4/2002 | |
| JP | 2005-190425 A | 7/2005 | |

(Continued)

OTHER PUBLICATIONS

Office Communication dated Apr. 4, 2018 in Canadian Patent Application No. 2,959,230, (6pages).

(Continued)

*Primary Examiner* — Mark A Fleischer
(74) *Attorney, Agent, or Firm* — DLA Piper LLP (US)

(57) ABSTRACT

A computer-implemented method for generating an explanation for a benefit qualification status change over different benefit qualification periods includes a computing device executing a benefit calculation engine. The benefit calculation engine operates on first and second benefit completeness graphs from respective first and second benefit qualification periods to perform first and second benefit qualification status determination. The first and second benefit completeness graphs each describe data dependent benefit qualification operations including a plurality of interconnecting functional nodes connected by one of a plurality of functions. The method also includes the computing device identifying the differences among nodes within the first benefit completeness graph and the second benefit completeness graph. The method further includes the computing device executing an explanation engine associated with the benefit calculation engine to generate a textual explanation identifying one or more differences among the nodes.

32 Claims, 16 Drawing Sheets

(56) References Cited

U.S. PATENT DOCUMENTS

| | | |
|---|---|---|
| 5,557,761 A | 9/1996 | Chan et al. |
| 5,673,369 A | 9/1997 | Kim |
| 5,742,836 A | 4/1998 | Turpin et al. |
| 5,819,249 A | 10/1998 | Dohanich |
| 6,078,898 A | 6/2000 | Davis |
| 6,535,883 B1 | 3/2003 | Lee et al. |
| 6,601,055 B1 | 7/2003 | Roberts |
| 6,631,361 B1 | 10/2003 | O'Flaherty et al. |
| 6,670,969 B1 | 12/2003 | Halstead et al. |
| 6,690,854 B2 | 2/2004 | Helbing |
| 6,697,787 B1 | 2/2004 | Miller |
| 6,898,573 B1 | 5/2005 | Piehl |
| 6,910,003 B1 | 6/2005 | Arnold |
| 6,912,508 B1 | 6/2005 | McCalden |
| 7,062,466 B2 | 6/2006 | Wagner |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 | 5/2009 | Peak et al. |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison et al. |
| 7,716,094 B1 | 5/2010 | Sutter et al. |
| 7,725,408 B2 | 5/2010 | Lee |
| 7,742,958 B1 | 6/2010 | Leek |
| 7,747,484 B1 | 6/2010 | Stanley |
| 7,761,333 B2 | 7/2010 | Kapp |
| 7,778,895 B1 | 8/2010 | Baxter |
| 7,818,222 B2 | 10/2010 | Allanson et al. |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,767 B1 | 3/2011 | Cheatham et al. |
| 7,912,768 B2 | 3/2011 | Abeles |
| 7,925,553 B2 | 4/2011 | Banks |
| 8,001,006 B1 | 8/2011 | Yu et al. |
| 8,019,664 B1 | 9/2011 | Tifford et al. |
| 8,082,144 B1* | 12/2011 | Brown .................. G06F 17/243 379/201.1 |
| 8,086,970 B2 | 12/2011 | Achtermann et al. |
| 8,108,258 B1 | 1/2012 | Slattery |
| 8,126,820 B1 | 2/2012 | Talan |
| 8,156,025 B1 | 4/2012 | Gymer |
| 8,190,499 B1 | 5/2012 | McVickar |
| 8,204,768 B1* | 6/2012 | Grinberg ................ G06Q 40/08 705/35 |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,321,312 B2 | 11/2012 | Allanson et al. |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 | 3/2013 | Eftekhari et al. |
| 8,417,596 B1 | 4/2013 | Dunbar et al. |
| 8,417,597 B1 | 4/2013 | McVickar |
| 8,423,433 B1 | 4/2013 | Miller |
| 8,447,667 B1 | 5/2013 | Dinamani et al. |
| 8,452,676 B1 | 5/2013 | Talan |
| 8,463,676 B1 | 6/2013 | Dinamani et al. |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Olim |
| 8,560,409 B2 | 10/2013 | Abeles |
| 8,577,760 B2 | 11/2013 | Rutsch et al. |
| 8,583,516 B1 | 11/2013 | Pitt et al. |
| 8,589,262 B1 | 11/2013 | Gang |
| 8,607,353 B2 | 12/2013 | Rippert et al. |
| 8,612,318 B1 | 12/2013 | Blowers |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 8,892,467 B1 | 11/2014 | Ball |
| 8,949,270 B2 | 2/2015 | Newton et al. |
| 9,117,118 B1 | 8/2015 | Lewis |
| 9,372,687 B1 | 6/2016 | Pai |
| 9,524,525 B2 | 12/2016 | Manyam |
| 9,690,854 B2 | 6/2017 | Stent et al. |
| 9,760,953 B1 | 9/2017 | Wang et al. |
| 9,916,628 B1 | 3/2018 | Wang et al. |
| 9,922,376 B1 | 3/2018 | Wang et al. |
| 9,990,678 B1 | 6/2018 | Cabrera et al. |
| 10,096,072 B1 | 10/2018 | Ali |
| 10,140,666 B1 | 11/2018 | Wang |
| 10,157,426 B1 | 12/2018 | Wang |
| 10,169,826 B1 | 1/2019 | Wang |
| 10,176,534 B1 | 1/2019 | Mascaro |
| 10,204,382 B2 | 2/2019 | Morin |
| 2002/0022986 A1 | 2/2002 | Coker |
| 2002/0023064 A1* | 2/2002 | Grimse ................ G06F 9/453 706/19 |
| 2002/0065831 A1 | 5/2002 | DePaolo |
| 2002/0107698 A1 | 8/2002 | Brown |
| 2002/0111888 A1 | 8/2002 | Stanley et al. |
| 2002/0133410 A1 | 9/2002 | Hermreck et al. |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0174157 A1 | 9/2003 | Hellman |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0021678 A1 | 2/2004 | Ullah et al. |
| 2004/0078271 A1 | 4/2004 | Morano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0181543 A1 | 9/2004 | Wu et al. |
| 2004/0205008 A1 | 10/2004 | Haynie et al. |
| 2004/0230397 A1* | 11/2004 | Chadwick ............ G06Q 10/10 702/181 |
| 2005/0171822 A1 | 8/2005 | Cagan |
| 2005/0216379 A1 | 9/2005 | Ozaki |
| 2005/0228685 A1 | 10/2005 | Schuster |
| 2005/0262191 A1 | 11/2005 | Mamou et al. |
| 2006/0112114 A1 | 5/2006 | Yu |
| 2006/0155618 A1 | 7/2006 | Wyle |
| 2006/0155632 A1 | 7/2006 | Cherkas et al. |
| 2006/0178961 A1 | 8/2006 | Stanley et al. |
| 2006/0282354 A1 | 12/2006 | Varghese |
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0055571 A1 | 3/2007 | Fox et al. |
| 2007/0094207 A1 | 4/2007 | Yu et al. |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |

(56) References Cited

U.S. PATENT DOCUMENTS

| | | |
|---|---|---|
| 2007/0250418 A1 | 10/2007 | Banks et al. |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |
| 2008/0177631 A1 | 7/2008 | William |
| 2008/0189197 A1 | 8/2008 | Allanson et al. |
| 2008/0215392 A1 | 9/2008 | Rajan |
| 2008/0243531 A1 | 10/2008 | Ryder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0192827 A1* | 7/2009 | Andersen ............... G06Q 40/08 705/4 |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendorf et al. |
| 2010/0100561 A1 | 4/2010 | Cooper |
| 2010/0131394 A1 | 5/2010 | Rutsch |
| 2010/0153138 A1 | 6/2010 | Evans |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2011/0284213 A1 | 11/2011 | Kowalewski |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1 | 5/2012 | Eftekhari |
| 2012/0109793 A1 | 5/2012 | Abeles |
| 2012/0136764 A1 | 5/2012 | Miller |
| 2012/0278365 A1 | 11/2012 | Labat et al. |
| 2013/0030839 A1 | 1/2013 | Opfer |
| 2013/0036347 A1 | 2/2013 | Eftekhari |
| 2013/0080302 A1 | 3/2013 | Allanson et al. |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0058763 A1* | 2/2014 | Zizzamia ............... G06Q 40/08 705/4 |
| 2014/0067949 A1 | 3/2014 | Dearlove |
| 2014/0108213 A1 | 4/2014 | Houseworth |
| 2014/0149303 A1 | 5/2014 | Band |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade et al. |
| 2015/0066715 A1 | 3/2015 | Carrier |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1* | 3/2016 | Goldman ............... G06Q 40/123 705/31 |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0162456 A1 | 6/2016 | Munro |
| 2016/0162459 A1* | 6/2016 | Parker ................... G06F 17/243 715/226 |
| 2016/0247239 A1 | 8/2016 | Houseworth |
| 2016/0275627 A1 | 9/2016 | Wang |
| 2016/0283353 A1 | 9/2016 | Owen |
| 2017/0004583 A1 | 1/2017 | Wang |
| 2017/0004584 A1 | 1/2017 | Wang |
| 2017/0032468 A1 | 2/2017 | Wang |
| 2017/0046492 A1 | 2/2017 | Renner |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).

(56) References Cited

OTHER PUBLICATIONS

Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/462,411 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Solomon L. Pollack; Analysis of the Decision Rules in Decision Tables, May 1963; The Rand Corooration; pp. iii, iv, 1, 20, & 24 (Year: 1963).
Communication pursuant to Rules 70(2) and 70a(2) EPC dated Apr. 25, 2018 in European Patent Application No. 16843282.1-1217, (1page).
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, dated Jan. 11, 2018, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).

(56) References Cited

OTHER PUBLICATIONS

Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, dated Jan. 11, 2018, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports--graphs-and-snapshots/track-the-earnings-taxes--deductions--or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.

(56) References Cited

OTHER PUBLICATIONS

Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor: Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).

(56) References Cited

OTHER PUBLICATIONS

Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
Office Action dated Sep. 14, 2017 in U.S. Appl. No. 14/530,159, (41pages).
PCT International Search Report for PCT/US2017/062777, Applicant: Intuit Inc., Form PCT/ISA/210 and 220, dated Feb. 21, 2018 (5pages).
PCT Written Opinion of the International Search Authority for PCT/US2017/062777, Applicant: The Regents of the University of California, Form PCT/ISA/237, dated Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Vanderbilt University, "Free tax prep help available for Vanderbilt employees", Feb. 6, 2014, Vanderbilt University, p. 1-3 [NPL-1].
"Ways to Increase your Tax Refund you Never Thought About", Intuit TurboTax (Year: 2017), 1 page.

(56) References Cited

OTHER PUBLICATIONS

U.S. Appl. No. 14/553,347, filed Nov. 25, 2014.
U.S. Appl. No. 14/530,159, filed Oct. 31, 2014.
U.S. Appl. No. 16/226,507, filed Dec. 19, 2018.
U.S. Appl. No. 15/221,495, filed Jul. 27, 2016.
Six, Janet M., "Going Mobile: Designing for Different Screen Sizes Promoting Your Mobile App" https://www.uxmatters.com/mt/archives/2010/10/going-mobile-designing-for-different-screen-sizes-promoting-your-mobile-app.php, 2010.
U.S. Appl. No. 14/673,261, filed Mar. 30, 2015.
U.S. Appl. No. 15/335,294, filed Oct. 26, 2016.
U.S. Appl. No. 15/335,326, filed Oct. 26, 2016.
U.S. Appl. No. 15/221,511, filed Jul. 27, 2016.
U.S. Appl. No. 15/221,471, filed Jul. 27, 2016.

* cited by examiner

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule$_1$ | Y | ? | ? | ? | N | ? | ? | 40% | 10% |
| Rule$_2$ | N | Y | Y | ? | ? | ? | N | 20% | 5% |
| Rule$_3$ | N | Y | N | Y | ? | N | ? | 14% | 6% |
| Rule$_4$ | Y | ? | ? | ? | N | Y | N | 65% | 20% |
| Rule$_5$ | N | Y | N | ? | ? | ? | Y | 18% | 40% |
| Rule$_6$ | Y | Y | N | ? | ? | N | ? | 5% | 25% |

FIG. 11

METHODS, SYSTEMS AND COMPUTER PROGRAM PRODUCTS FOR GENERATING EXPLANATIONS FOR A BENEFIT QUALIFICATION CHANGE

This application includes subject matter similar to the subject matter described in the following co-owned applications: (1) U.S. application Ser. No. 15/221,471, filed Jul. 27, 2016, entitled "METHODS, SYSTEMS AND COMPUTER PROGRAM PRODUCTS FOR ESTIMATING LIKELIHOOD OF QUALIFYING FOR BENEFIT"; (2) U.S. application Ser. No. 15/221,495, filed Jul. 27, 2016, entitled "METHODS, SYSTEMS AND COMPUTER PROGRAM PRODUCTS FOR PRIORITIZATION OF BENEFIT QUALIFICATION QUESTIONS"; and (3) U.S. application Ser. No. 15/221,511, filed Jul. 27, 2016, entitled "METHODS, SYSTEMS AND COMPUTER PROGRAM PRODUCTS FOR GENERATING NOTIFICATIONS OF BENEFIT QUALIFICATION CHANGE". The contents of the above-mentioned applications are fully incorporated herein by reference as though set forth in full.

SUMMARY

Embodiments are directed to systems, computer-implemented methods, and computer program products for generating an explanation for a benefit qualification status change over different benefit qualification periods.

In one embodiment, a computer-implemented method for generating an explanation for a benefit qualification status change over different benefit qualification periods includes a computing device executing a benefit calculation engine. The benefit calculation engine operates on a first benefit completeness graph from a first benefit qualification period to perform a first benefit qualification status determination. The benefit calculation engine operates on a second benefit completeness graph from a second benefit qualification period and different in at least one respect from the first benefit completeness graph to perform a second benefit qualification status determination. The first and second benefit completeness graphs each describe data dependent benefit qualification operations including a plurality of interconnecting functional nodes connected by one of a plurality of functions. The method also includes the computing device identifying the differences among nodes within the first benefit completeness graph and the second benefit completeness graph. The method further includes the computing device executing an explanation engine associated with the benefit calculation engine to generate a textual explanation identifying one or more differences among the nodes.

In one or more embodiments, the second benefit completeness graph differs from the first completeness graph based on an addition of one or more additional interconnecting functional nodes. The computing device may execute an explanation engine associated with the benefit calculation engine to generate a textual explanation of one or more differences as a result of the one or more additional interconnecting functional nodes. The second benefit completeness graph may differ from the first completeness graph based on a deletion of one or more additional interconnecting functional nodes. The computing device may execute an explanation engine associated with the benefit calculation engine to generate a textual explanation of one or more differences as a result of the one or more deleted interconnecting functional nodes.

In one or more embodiments, the second benefit completeness graph differs from the first completeness graph based on different functions connecting similar nodes. The first benefit qualification period may include a current benefit qualification year and the second benefit qualification period may include an immediately preceding benefit qualification year. The first benefit completeness graph may include estimates for the current benefit qualification year. The first benefit qualification period may include a future benefit qualification year and the second benefit qualification period includes a current or past benefit qualification year.

In one or more embodiments, data populating the first benefit completeness graph is copied from data contained within a second benefit completeness graph for a current or past benefit qualification year. At least some of the data populating the first benefit completeness graph may be manually entered by the user. The first benefit completeness graph and the second benefit completeness graph may each include respective subgraphs of larger corresponding benefit completeness graphs. Each node of the first benefit completeness graph and the second benefit completeness graph may include a common benefit concept.

In one or more embodiments, the textual explanation further includes numerical information. The textual explanation may include a summary of a plurality of benefit programs. Each benefit program in the plurality of benefit programs may correspond to a respective benefit qualification status change. Each benefit program in the plurality of benefit programs may correspond to a respective benefit qualification status change between a benefit qualification year and an immediately preceding benefit qualification year.

In one of more embodiments, the summary includes a number corresponding to the node(s) resulting in the benefit qualification status change. The summary may include information regarding a node resulting in the benefit qualification status change.

In another embodiment, a system for generating an explanation for a benefit qualification status change over different benefit qualification periods includes a computing device having a benefit calculation engine and an explanation engine running thereon. The computing device executing the benefit calculation engine. The benefit calculation engine operating on a first benefit completeness graph from a first benefit qualification period to perform a first benefit qualification status determination. The benefit calculation engine operating on a second benefit completeness graph from a second benefit qualification period and different in at least one respect from the first benefit completeness graph to perform a second benefit qualification status determination. The first and second benefit completeness graphs each describing data dependent benefit qualification operations including a plurality of interconnecting functional nodes connected by one of a plurality of functions. The computing device also executing the benefit calculation engine to identify the differences among nodes within the first benefit completeness graph and the second benefit completeness graph. The computing device also executing the explanation engine to generate a textual explanation for the one or more differences among the nodes.

In one or more embodiments, the explanation engine also includes a natural language generator for generating a natural language textual explanation. The natural language textual explanation may be displayed on a display along with a numerical benefit calculation. The computing device may execute the explanation engine to generate a textual explanation difference based an additional node in one of the first and second benefit completeness graphs.

In one or more embodiments, the computing device executes the explanation engine to generate a textual explanation difference based a deleted node in one of the first and second benefit completeness graphs. The computing device may execute the explanation engine to generate a textual explanation difference based a different function associated with a node in one of the first and second benefit completeness graphs. The textual explanation may include a summary of a plurality of benefit programs. Each benefit program in the plurality of benefit programs may correspond to a respective benefit qualification status change. Each benefit program in the plurality of benefit programs may correspond to a respective benefit qualification status change between a benefit qualification year and an immediately preceding benefit qualification year.

In one or more embodiments, the summary includes a number corresponding to the node(s) resulting in the benefit qualification status change. The summary may include information regarding a node resulting in the benefit qualification status change.

In still another embodiment, a computer program product including a non-transitory computer readable storage medium embodying one or more instructions executable by a computing device having associated benefits calculation engine and explanation engine to perform a process for generating an explanation for a benefit qualification status change over different benefit qualification periods. The process includes the computing device executing the benefit calculation engine, the benefit calculation engine operating on a first benefit completeness graph from a first benefit qualification period to perform a first benefit qualification status determination, the benefit calculation engine operating on a second benefit completeness graph from a second benefit qualification period and different in at least one respect from the first benefit completeness graph to perform a second benefit qualification status determination, the first and second benefit completeness graphs each describing data dependent benefit qualification operations including a plurality of interconnecting functional nodes connected by one of a plurality of functions, the computing device identifying the differences among nodes within the first benefit completeness graph and the second benefit completeness graph, and the computing device executing the explanation engine to generate a textual explanation identifying one or more differences among the nodes.

BRIEF DESCRIPTION OF THE DRAWINGS

The foregoing and other aspects of embodiments are described in further detail with reference to the accompanying drawings, in which the same elements in different figures are referred to by common reference numerals, wherein:

FIG. 11 illustrates another embodiment of a decision table that incorporates statistical data.

Figure 1:
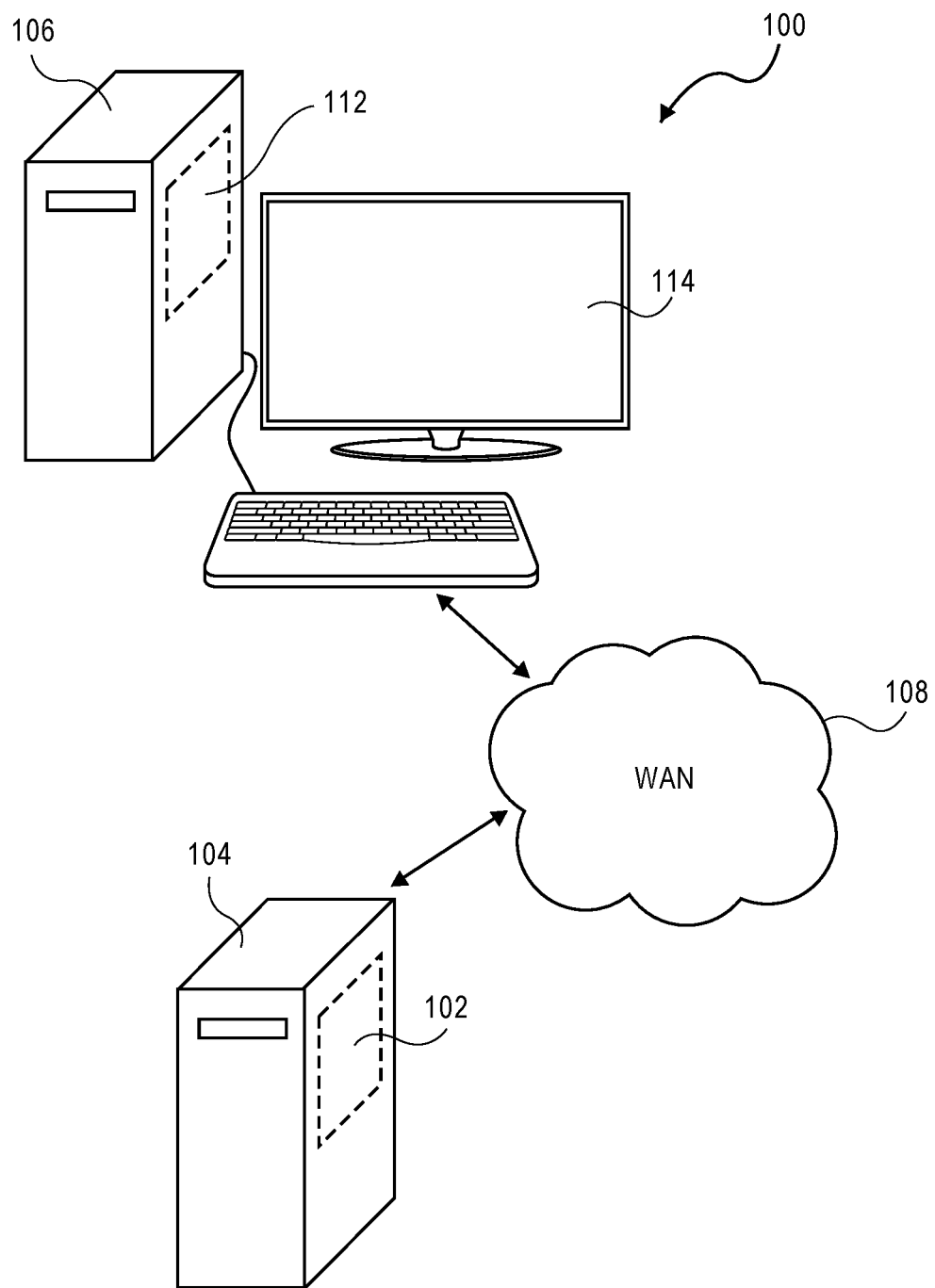
FIGS. 1 to 4 are schematic diagrams illustrating the implementation of benefit analysis systems on computing devices according to various embodiments.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

Embodiments describe methods, systems and articles of manufacture for generating an explanation for a benefit qualification status change over different benefit qualification periods. In particular, some embodiments describe a computing device executing a benefit calculation engine, which operates on first and second benefit calculation graphs from first and second benefit qualification periods to determine first and second benefit qualification statuses. The computing device identifies differences among nodes within the first and second benefit calculation graphs. Then, the computing device executes an explanation engine to generate a textual explanation identifying one or more differences among the nodes.

There are a large number of benefit programs available to individuals from both governmental and nongovernmental entities. As used in this application, a "benefit program" includes, but is not limited to, any program, service, project or activity that directly assists individuals who meet certain qualifications. As used in this application, an individual "qualifying for a benefit program" includes, but is not limited to, an individual having the requirements to receive benefits under a benefit program.

For instance, there are at least 10 benefit programs available to individuals residing in California (e.g., CalFresh, California CalWORKs (TANF), California Head Start, California Low Income Home Energy Assistance Program, California Medicaid, California National School Breakfast and Lunch Program, California Special Milk Program, California Special Supplemental Nutrition Program for Women, Infants, and Children (WIC), California Unemployment Insurance, and California Weatherization Assistance Program).

Benefit programs are available in many different categories (e.g., Agriculture Loans, American Indian/Alaska Native, American Indian/Alaska Native Youth, Business Loans, Child Care/Child Support, Counsel/Counseling, Disability Assistance, Disaster Relief, Disaster Relief Loans, Education Loans, Education/Training, Employment/Career Development Assistance, Energy Assistance, Environmental Sustainability/Conservation, Family Social Security, Food/Nutrition, General Loans, Grants/Scholarships/Fellowships, Healthcare, HIV/AIDS, Housing, Housing Loans, Insurance, Living Assistance, Medicaid/Medicare, Military: Active Duty and Veterans, Social Security Disability Assistance, Social Security Insurance, Social Security Medicare, Social Security Retirement, Spouse & Widower(er) Social Security, Supplemental Security Income, Tax Assistance, Veteran Loans, Veterans Social Security, and Volunteer Opportunities).

Benefit programs are also available from a variety of agencies (e.g., Barry Goldwater Scholarship Foundation, Christopher Columbus Fellowship Foundation, Harry S. Truman Scholarship Foundation, James Madison Fellowship Foundation, Library of Congress, National and Community Service, National Endowment for the Arts, The Udall Foundation, U.S. Department of Agriculture, U.S. Department of Commerce, U.S. Department of Education, U.S. Department of Energy, U.S. Department of Health and Human Services, U.S. Department of Homeland Security, U.S. Department of Housing and Urban Development, U.S. Department of Justice, U.S. Department of Labor, U.S. Department of State, U.S. Department of the Interior, U.S. Department of the Treasury, U.S. Department of Transportation, U.S. Department of Veterans Affairs, U.S. Office of Personnel Management, U.S. Railroad Retirement Board, U.S. Small Business Administration, U.S. Social Security Administration, Woodrow Wilson National Fellowship Foundation).

The large number of benefit programs available to individuals can result in information overload for individuals investigating whether they qualify for any benefit programs, which may frustrate these individuals, causing them to pause or end their investigation. This, in turn, can prevent individuals from receiving benefits to which they are entitled. The large number of benefit programs also make it difficult for individuals to understand changes in their qualification status with regard to these benefit programs, making it difficult for individuals receiving benefits under these programs to plan their personal or household budgets.

Current benefit analysis systems and software only provide current benefit qualification status. Current benefit analysis systems and software do not track changes in benefit qualification status or generate explanations for same. This severely hampers the ability of individuals receiving benefits to plan their budgets and behavior to maximize those benefits.

Some embodiments described herein involve a profile corresponding to an individual and two completeness graphs corresponding to two different benefit qualification periods. Some embodiments operate on the two completeness graphs to determine two benefit qualification statuses. Some embodiments provide a textual explanation identifying one or more differences among the nodes of the two completeness graphs. Understanding the differences between the two completeness graphs informs benefit recipients regarding changes in relevant benefit programs, which in turn allows them to more effectively plan their finances and other life choices.

The embodiments described herein facilitate efficient and effective financial and lifestyle planning by providing explanations of benefit qualification status change. More efficient and effective financial and lifestyle planning can improve the impact of benefit programs in the individual and household budgets of those who need the programs the most.

As used in this application, a "completeness graph" or "completion graph" includes, but is not limited to, a graphical representation including a plurality of interconnecting functional nodes connected by one of a plurality of functions. As used in this application, "satisfying a completeness graph" includes, but is not limited to, data such as a profile corresponding to an individual filling or partially filling the nodes of a completeness graph such that running the completeness graph results in a determination that the profile (i.e. the individual corresponding to the profile) qualifies for (i.e., to receive benefits under) the benefit program corresponding to the completeness graph.

As used in this application, a "user" includes, but is not limited to, a person investigating whether an individual qualifies for a benefit program using benefit analysis software. The "user" may or may not be the individual for whom benefit program qualification is being investigated. As used in this application, "benefit qualification data" includes, but is not limited to, information that may affect an individual's qualifications for a benefit program. As used in this application, a "previously collected benefit qualification data" includes, but is not limited to, benefit qualification data that was previously collected (e.g., a previous year's benefit qualification data).

As used in this application, "benefit qualification data source" includes, but is not limited to, a source of benefit qualification data (e.g., tax preparers or financial management systems). As used in this application, a "financial management system" includes, but is not limited to, software that oversees and governs an entity's finances (e.g., income, expenses, and assets). An exemplary financial management system is MINT Financial Management Software, which is available from Intuit Inc. of Mountain View, Calif. A financial management system is executed to assist a user with managing its finances, and is used solely for financial management. Financial management systems manage financial transaction data from financial transaction generators such as accounts including checking, savings, money market, credit card, stock, loan, mortgage, payroll or other types of account. Such financial transaction generators can be hosted at a financial institution such as a bank, a credit union, a loan services or a brokerage. Financial transaction data may include, for example, account balances, transactions (e.g., deposits, withdraws, and bill payments), debits, credit card transactions (e.g., for merchant purchases). Financial management systems can also obtain financial transaction data directly from a merchant computer or a point of sale terminal. Financial management systems can include financial transaction data aggregators that manage and organize financial transaction data from disparate sources. While certain embodiments are described with reference to MINT Financial Management Software, the embodiments described herein can include other financial management systems such as QUICKEN Financial Management Software, QUICKRECIPTS Financial Management Software, FINANCEWORKS Financial Management Software, Microsoft Money Financial Management Software and YODLEE Financial Management Software (available from Yodlee, Inc. of Redwood City, Calif.).

As used in this application, "estimating a likelihood" includes, but is not limited to, a benefit program qualification calculated from less than all of the required benefit qualification data. As used in this application, "benefit code," "benefit regulation," and "benefit rule," includes, but is not limited to, statutes, regulations, and rules relating to qualification for benefit programs in various jurisdictions (e.g., state and federal), including the United States of America and other jurisdictions around the world. As used in this application, an "unanswered question in or for a completeness graph" includes, but is not limited to, an empty or undetermined node in the completeness graph.

As used in this application, "computer," "computer device," or "computing device" includes, but are not limited to, a computer (laptop or desktop) and a computer or computing device of a mobile communication device, smartphone and tablet computing device such as an IPAD (available from Apple Inc. of Cupertino, Calif.). As used in this application, "benefit analysis system," "benefit analysis computing device," "benefit analysis computer," "benefit analysis software," "benefit analysis module," "benefit analysis application," or "benefit analysis program" includes, but are not limited to, one or more separate and independent software and/or hardware components of a computer that must be added to a general purpose computer before the computer can analyze whether an individual qualifies for a benefit program, and computers having such components added thereto.

As used in this application, "server" or "server computer" includes, but is not limited to, one or more separate and independent software and/or hardware components of a computer that must be added to a general purpose computer before the computer can receive and respond to requests from other computers and software in order to share data or hardware and software resources among the other computers and software, and computers having such components added thereto. As used in this application, "obtaining data" includes, but is not limited to, accessing data (e.g., from a database through a network) and generating data (e.g., using one or more hardware and software components).

As used in this application, "input/output module" or "input output module" includes, but is not limited to, one or more separate and independent software and/or hardware components of a computer that must be added to a general purpose computer before the computer can communicate with and facilitate the receipt and transfer of information, including schema, completeness graphs, profiles, benefit qualification data and data relating to benefit qualification data sources, from and to other computers. As used in this application, "memory module" includes, but is not limited to, one or more separate and independent software and/or hardware components of a computer that must be added to a general purpose computer before the computer can store information, including schema, completeness graphs, profiles, benefit qualification data and data relating to benefit qualification data sources. As used in this application, a "benefits calculation engine" includes, but is not limited to, one or more separate and independent software and/or hardware components of a computer that must be added to a general purpose computer before the computer can manipulate data to operate on a completeness graph. As used in this application, an "explanation engine" includes, but is not limited to, one or more separate and independent software and/or hardware components of a computer that must be added to a general purpose computer before the computer can generate a textual explanation corresponding to a difference between two data structures (e.g., nodes of completeness graphs). As used in this application, a "natural language generator" includes, but is not limited to, one or more separate and independent software and/or hardware components of a computer that must be added to a general purpose computer before the computer can form a natural language textual explanation. As used in this application, a "user interface manager" includes, but is not limited to, one or more separate and independent software and/or hardware components of a computer that must be added to a general purpose computer before the computer can receive information from and send information to an individual. As used in this application, "application programming interface" includes, but is not limited to, one or more separate and independent software and/or hardware components of a computer that must be added to a general purpose computer before the computer can receive information from and send information to a separate computer.

As used in this application, "website" includes, but is not limited to, one or more operatively coupled webpages. As used in this application, "browser" or "web browser" includes, but is not limited to, one or more separate and independent software and/or hardware components of a computer that must be added to a general purpose computer before the computer can receive, display and transmit resources from/to the World Wide Web.

FIG. 1 depicts an exemplary hardware system 100 on which a benefit analysis system 102 according to one embodiment can be executed. The hardware system 100 according to this embodiment includes a server computing device 104 and a user computing device 106, which are operatively coupled via a network 108. The network 108 may be two or more networks depending on the system configuration and communication protocols employed. One or more or all of networks 108 may be, for example, a wireless or cellular network, a Local Area Network (LAN) and/or a Wide Area Network (WAN). Reference to network 108 generally is not intended to refer to a specific network or communications protocol, and embodiments can be implemented using various networks 108 and combinations thereof.

The user computing device 106 has a browser 112 running thereon. The browser 112 is operatively coupled to the benefit analysis system 102 via the network 108, to facilitate a user physically interfacing with the user computing device 106 to interface with the benefit analysis system 102 running on the server computing device 104. The various computing devices 104, 106 may include visual displays or screens 114 operatively coupled thereto. In the embodiment depicted in FIG. 1, the user computing device 106 includes a display or a screen 114 through which a user physically interfaces with the user computing device 106 and the browser 112 running thereon.

While the user computing device 106 in FIG. 1 is depicted as a desktop computer providing access to the benefit analysis system 102 through a browser 112 running thereon, in other embodiments, the user may access the benefit analysis system 102 using a specific program running on the user computing device 106. In some embodiments, such as the ones shown in FIG. 2, the user computing device is a mobile computing device (e.g., tablet computer 106' or mobile phone 106"). In such embodiments, the user may access the benefit analysis system 102 using an application; and communication between the two computers 104, 106 may occur over a private communication network (e.g., mobile phone network).

Figure 2:
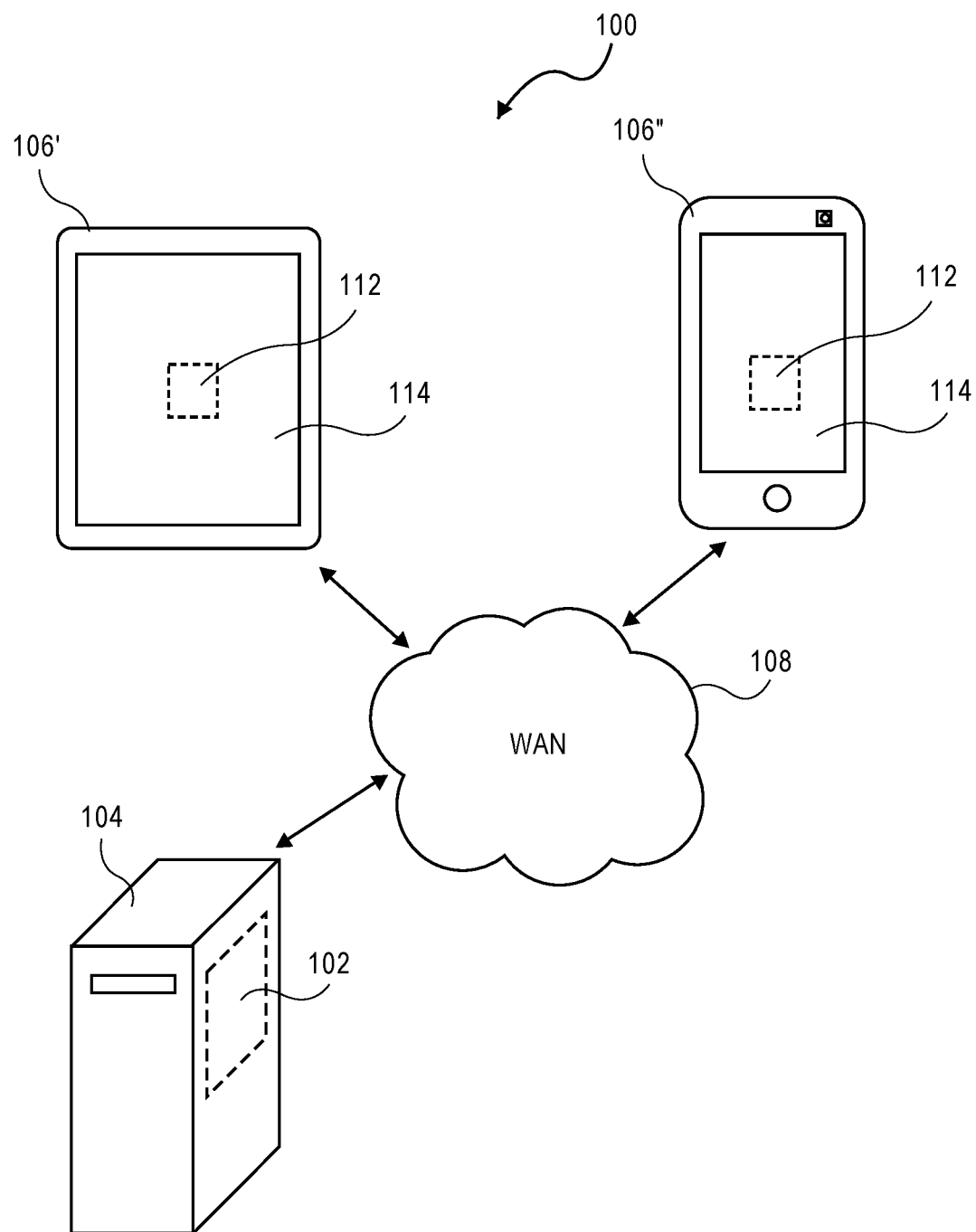
Figure 3:
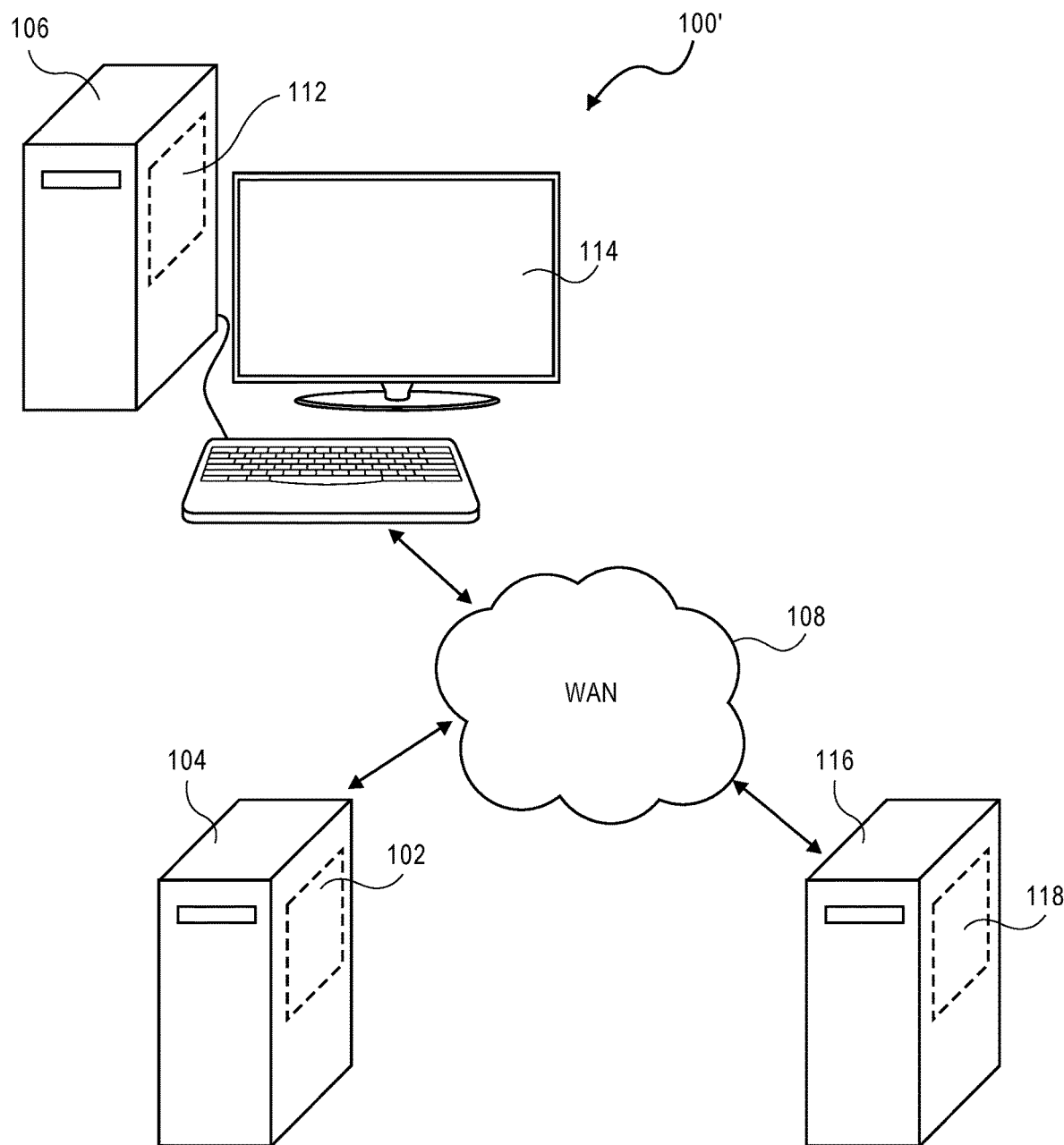

FIG. 3 depicts another exemplary hardware system 100' on which a benefit analysis system 102 according to another embodiment can be executed. The hardware system 100' depicted in FIG. 2 is similar to the hardware system 100 depicted in FIG. 1. However, in addition to the server computing device 104 and the user computing device 106, the hardware system 100' also includes a benefit qualification data source computer 116 operatively coupled to the server computing device 104 and the user computing device 106 via the network 108. The benefit qualification data source computer 116 hosts a benefit qualification data source program 118, from which the server computing device 104 and the user computing device 106 may obtain benefit qualification data.

Exemplary benefit qualification data source programs 118 include financial management systems utilized by the taxpayer (such as MINT or QUICKEN financial management systems), accounts the taxpayer has with an online social media website, third parties databases or resources (such as government databases or documents, such as property tax records, Department of Motor Vehicle (DMV) records), and other external sources of benefit qualification data. MINT and QUICKEN are registered trademarks of Intuit Inc., Mountain View, Calif. While FIG. 3 depicts the server computing device 104, the user computing device 106 and the benefit qualification data source computer 116 as being operatively coupled by the same network 108, in other embodiments, these computing devices may be operatively coupled by two or three networks. While FIG. 3 depicts the benefit analysis system 102 and the benefit qualification data source program 118 as running on separate computing devices 104, 116, in other embodiments, the benefit analysis system 102 and the benefit qualification data source program 118 may run on the same computing device (e.g., the server computing device 104).

Figure 4:
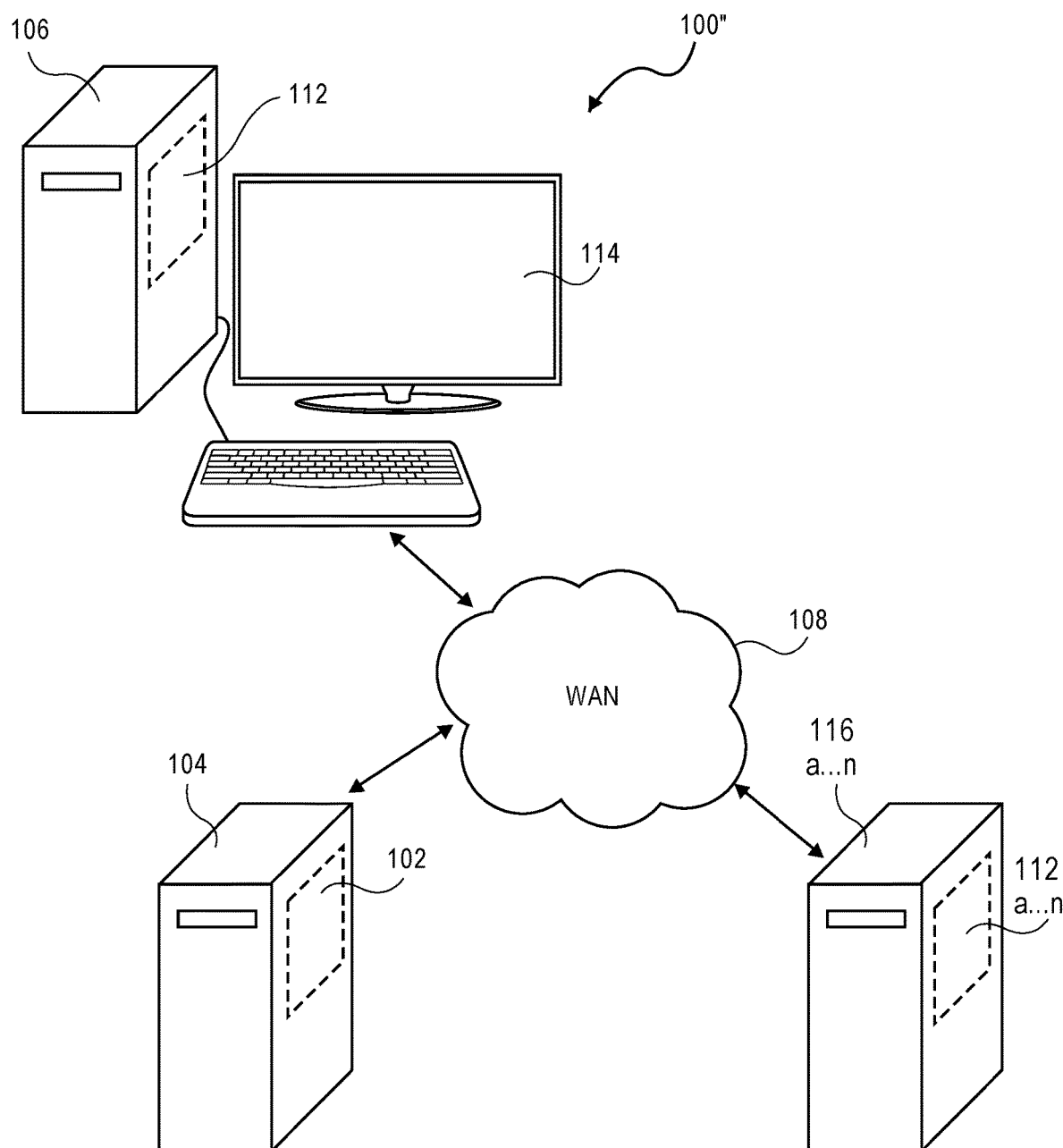

FIG. 4 depicts still another exemplary hardware system 100" on which a benefit analysis system 102 according to still another embodiment can be executed. The hardware system 100" depicted in FIG. 4 is similar to the hardware system 100 depicted in FIG. 1. However, in addition to the server computing device 104 and the user computing device 106, the hardware system 100" also includes a plurality of other user computing device 106a . . . 106n (belonging to other users of the benefit analysis system) operatively coupled to the server computing device 104 and the user computing device 106 via the network 108. The plurality of other user computing device 106a . . . 106n hosts a respective plurality of other user programs 112a . . . 112n (e.g., browsers accessing the benefit analysis system), from which the server computing device 104 and the user computing device 106 may obtain benefit qualification data (e.g., for cohort analysis).

Exemplary benefit qualification data that may be obtained from the plurality of other user programs 112a . . . 112n include anonymized benefit qualification data associated with a plurality of users. While FIG. 4 depicts the server computing device 104, the user computing device 106 and the plurality of other user computing device 106a . . . 106n as being operatively coupled by the same network 108, in other embodiments, these computing devices may be operatively coupled by a plurality of networks. While FIG. 4 depicts the benefit analysis system 102 and the plurality of other user programs 112a . . . 112n as running on separate computing devices 104, 106a . . . 106n, in other embodiments, multiple instantiations of the benefit analysis system 102 may run on user computing device 106a . . . 106n and the anonymized benefit qualification data may be collected on the server computing device 104.

Figure 5:
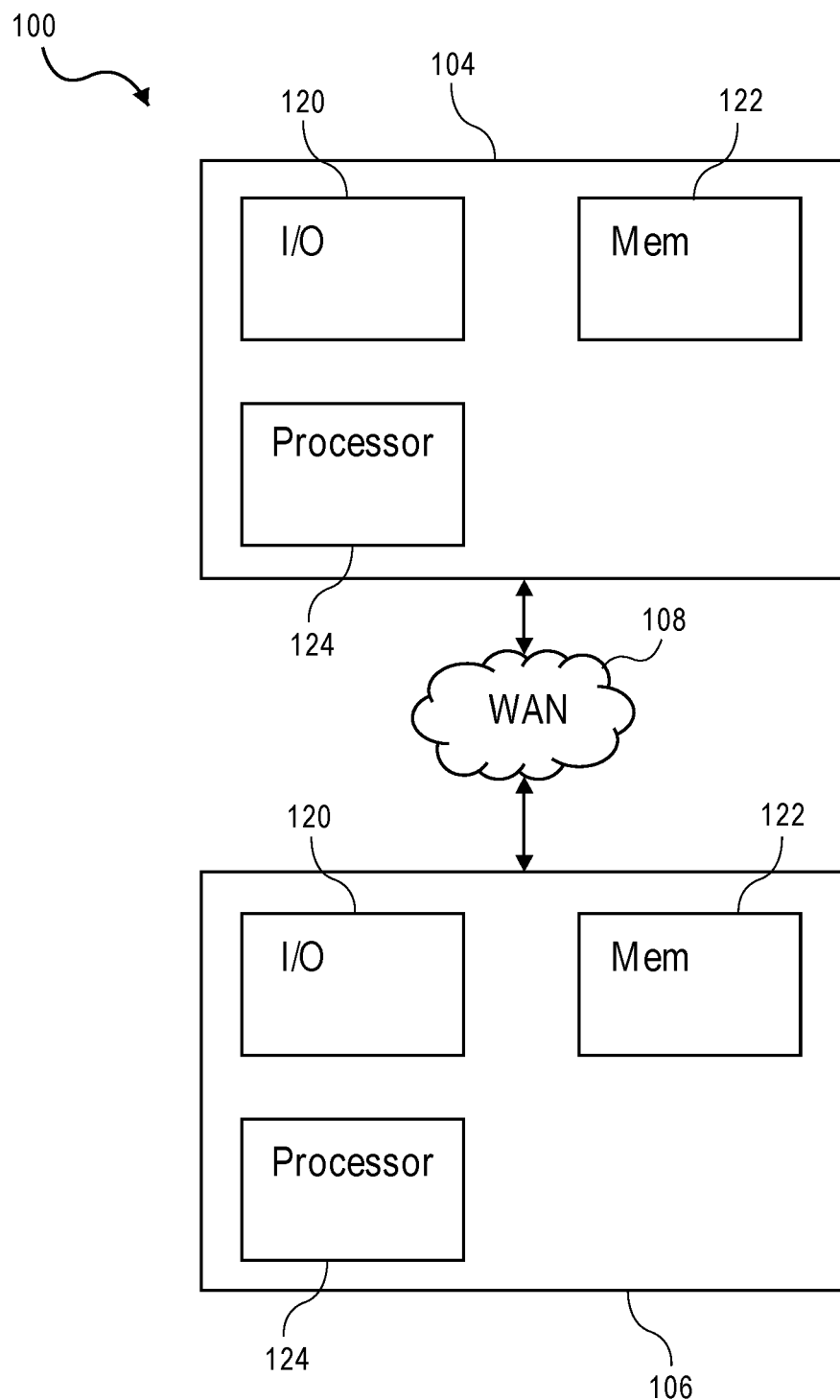
FIGS. 5 and 6 are block diagrams of computer systems according to various embodiments on which benefits analysis systems according to various embodiments may be implemented.

FIG. 5 depicts, in greater detail, another hardware system 100 configured to host a benefit analysis system 102 according to one embodiment. Like the hardware system 100 depicted in FIG. 1, the hardware system 100 in FIG. 5 includes a server computing device 104 and a user computing device 106 that are operatively coupled by a network 108. The server computing device 104 includes an input/output module 120, a memory module 122 and a processor 124. The user computing device 106 includes an input/output module 120, a memory module 122 and a processor 124. The input/output modules 120 are configured to communicate with and facilitate the receipt and transfer of benefit qualification data. The memory modules 122 are configured to store benefit qualification data, in proper formats for benefit qualification data acquisition and benefit qualification status determination. The processors 124 in the server computing device 104 and the user computing device 106 are configured to respectively run programs (e.g., benefit analysis system 102 and browser 112), as shown in FIG. 5.

Figure 6:
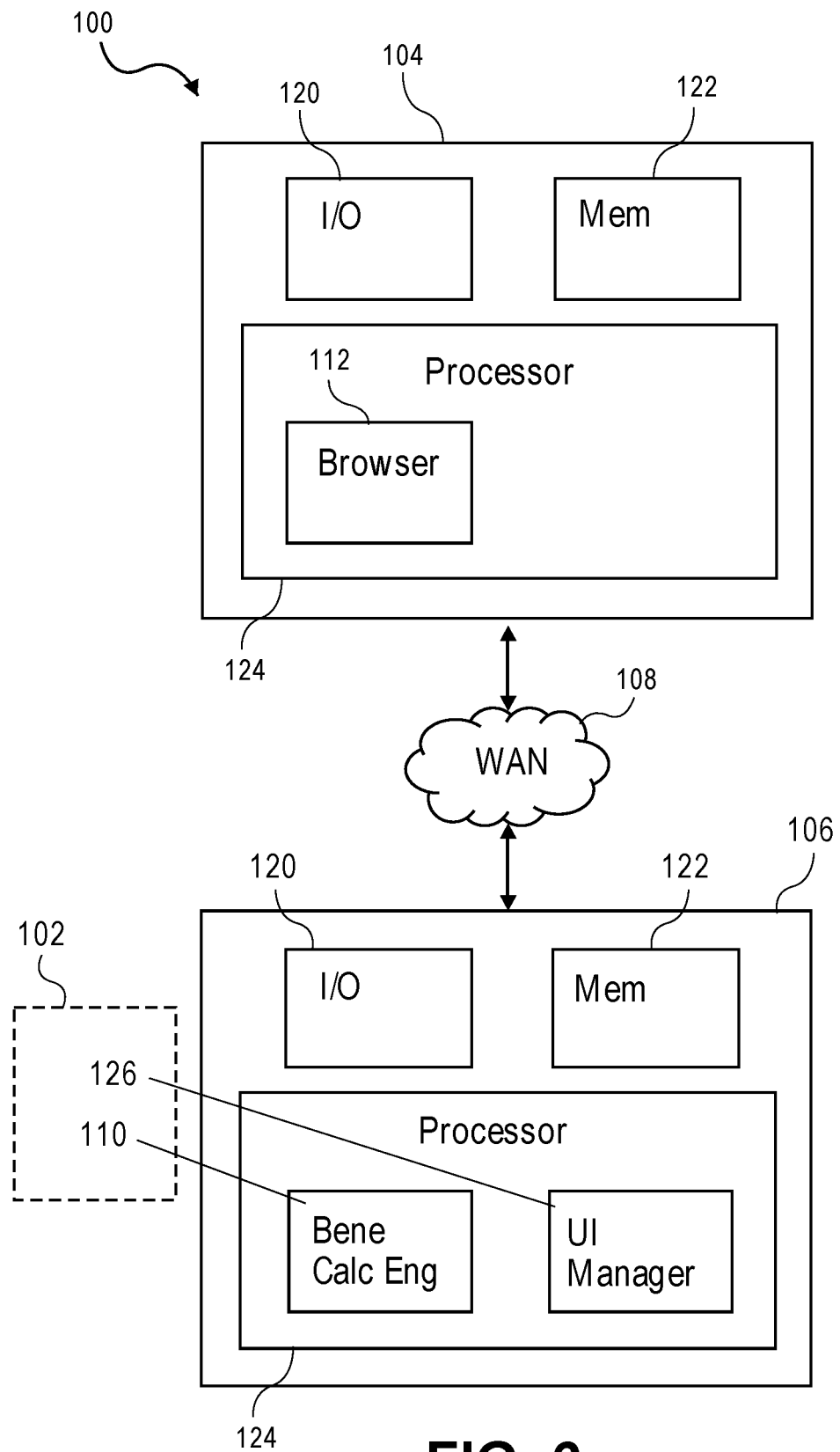

FIG. 6 depicts, in even greater detail, another hardware system 100 configured to host a benefit analysis system 102 according to one embodiment. Like the hardware system 100 depicted in FIG. 1, the hardware system 100 in FIG. 6 includes a server computing device 104 and a user computing device 106 that are operatively coupled by a network 108. The server computing device 104 includes an input/output module 120, a memory module 122 and a processor 124. The user computing device 106 includes an input/output module 120, a memory module 122 and a processor 124. The input/output modules 120 are configured to communicate with and facilitate the receipt and transfer of benefit qualification data. The memory modules 122 are configured to store benefit qualification data, in proper formats for benefit qualification data acquisition and benefit qualification status determination. The processors 124 in the server computing device 104 and the user computing device 106 are configured to respectively run programs (e.g., benefit analysis system 102 and browser 112). The benefit analysis system 102 includes a benefit calculation engine 110 configured to modify a completeness graph based on a benefit program qualification requirement change, and run profiles corresponding to individuals against the modified completeness graph corresponding to benefit programs with the benefit program qualification requirement change. The benefit analysis system 102 also includes a user interface manager 126 configured to generate a user interface for communication with a user. The browser 112 is configured to transmit information to and receive information from the benefit analysis system 102 (i.e., the benefits calculation engine 110 and the user interface manager 126). The browser 112 facilitates user interaction with the benefit analysis system 102 (i.e., the benefits calculation engine 110 and the user interface manager 126).

Figure 7:
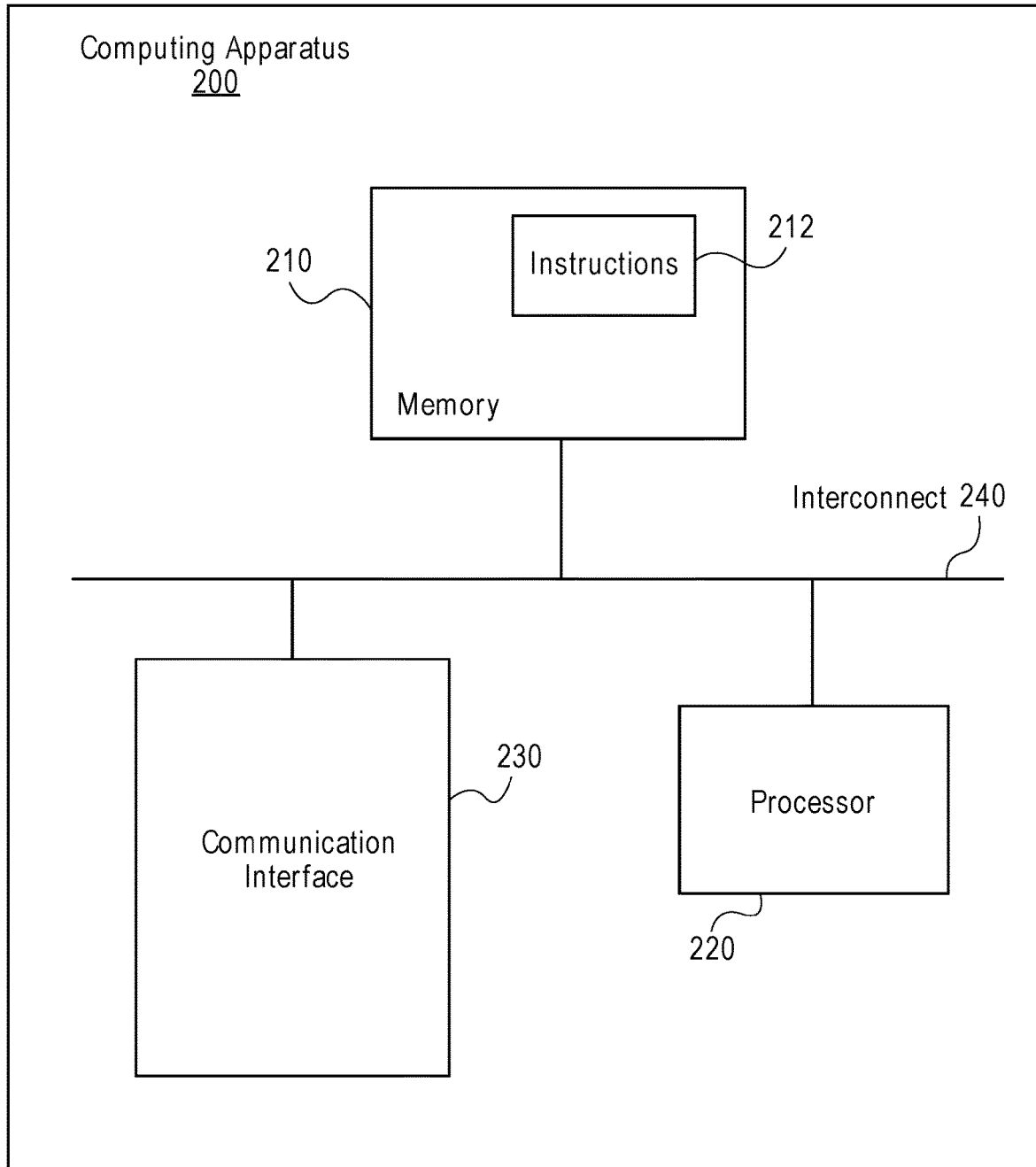
FIG. 7 is a block diagram of a computing apparatus or system in which various embodiments may be implemented or that may be utilized to execute various embodiments.

FIG. 7 generally illustrates certain components of a computing device 200 that may be utilized to execute embodiments and that includes a memory 210, program instructions 212, a processor or controller 220 to execute instructions 212, a network or communications interface 230, e.g., for communications with a network or interconnect 240 between such components. The memory 210 may be or include one or more of cache, RAM, ROM, SRAM, DRAM, RDRAM, EEPROM and other types of volatile or non-volatile memory capable of storing data. The processor unit 220 may be or include multiple processors, a single threaded processor, a multi-threaded processor, a multi-core processor, or other type of processor capable of processing data. Depending on the particular system component (e.g., whether the component is a computing device or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 7 is provided to generally illustrate how embodiments may be configured and implemented. The processors 124 in the server computing device 104 and the user computing device 106 are respectively programmed with the benefit analysis system 102 and the browser 112 so that they are no longer generic computing devices.

Having described various general hardware and software aspects of benefit analysis systems according to various embodiments, the benefit analysis software will now be described in greater detail, including data structures therein.

In existing systems, a user walks through a set of rigidly defined user interface interview screens that selectively ask questions that are relevant to a particular benefit program. In contrast to the rigidly defined user interface screens used in prior iterations of benefit analysis software, the embodiments described herein provide a benefit analysis system 102 that runs on server computing devices 104 (as seen in FIGS. 1 to 4) that operates on a new construct in which benefit qualification rules and the determinations based thereon are established in declarative data-structures, namely, one or more completeness/completion graphs 12 (see FIG. 8). Completeness graphs 12 are data structures in the form of graphs having interconnecting nodes 20 in which arcs 22 are directed from one node to another (e.g., 22a from 20a to 20b). Completeness graphs 12 identify when all conditions have been satisfied to complete a particular benefit program qualification determination (i.e., whether an individual qualifies for a particular benefit program). Use of these data-structures permits the user experience to be loosely connected or even divorced from the benefit calculation engine and the data used in the perfect qualification determinations. Benefit qualification is dynamically determined based on benefit qualification data derived from sourced data, estimates, user input, etc.

The completeness graphs 12 identify when a particular benefit program qualification determination has been completed or additional information is needed. The benefit calculation engine can review current run time data and evaluate missing data fields as identified by the completeness graphs 12 and propose suggested questions to be asked to a user to fill in missing blanks. This process can be continued until completeness of all benefit program qualification completeness graphs has occurred. Then the benefit analysis system can present a list of benefit programs for which the individual qualifies in the relevant jurisdictions.

According to one embodiment, a computer-implemented method for generating an explanation or other visual indicia reflective of changes in benefit qualification status over different benefit qualification periods (e.g., year-over-year) is provided. The method uses a computing device executing a benefit calculation engine that operates as part of the benefit analysis system. The benefit calculation engine operates on a different benefit qualification completeness graphs for different benefit qualification periods (e.g., different tax years) to perform respective benefit qualification determinations. For example, there may be a current year benefit qualification completeness graph and a prior year benefit qualification completeness graph for the immediately preceding benefit qualification year.

Figure 8:
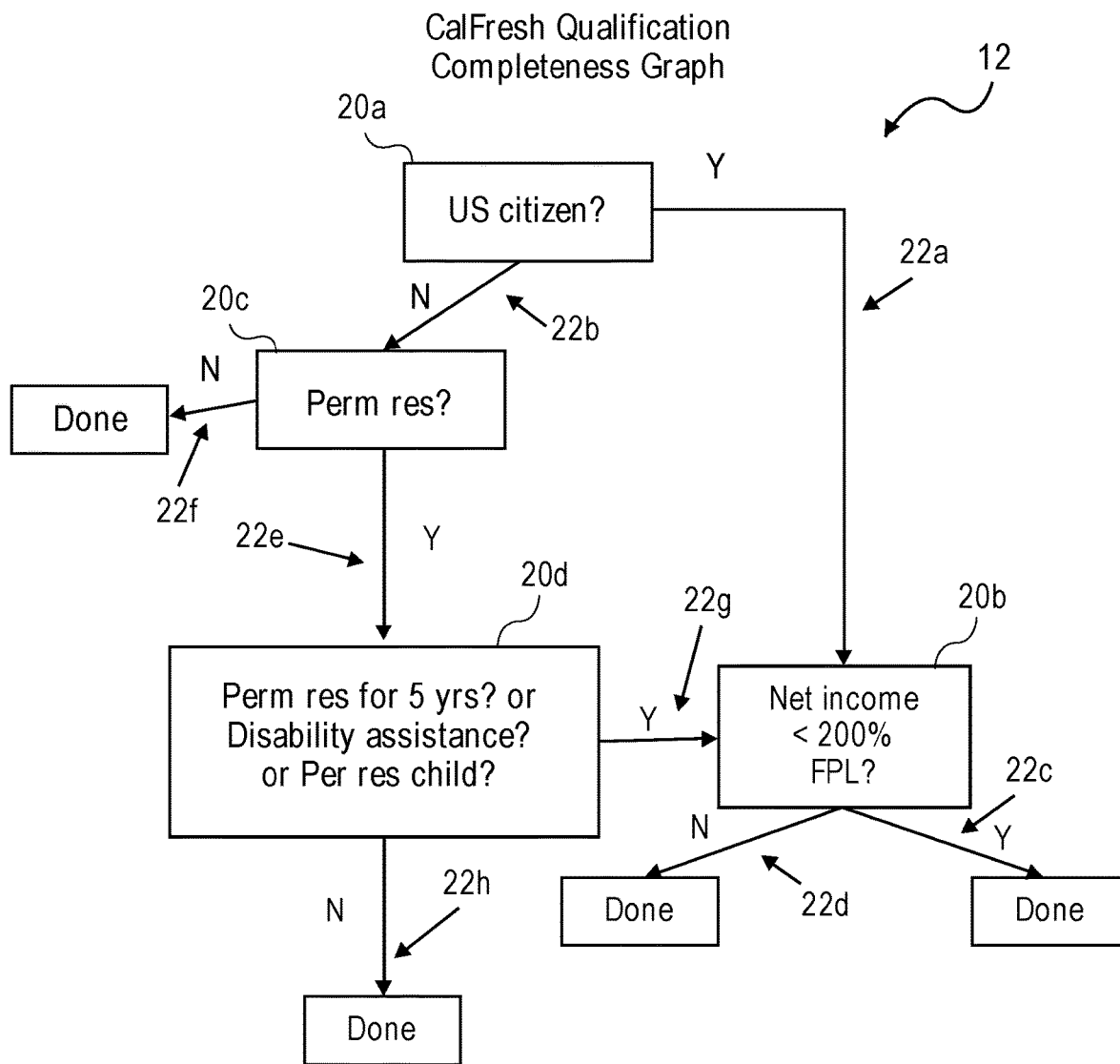
FIGS. 8 and 12 illustrate examples of a simplified version of a completeness graph according to two embodiments at two different benefits qualification periods.

The completeness graph 12 represents data structures that can be constructed in the form of tree. FIG. 8 illustrates a completeness graph 12 in the form of a tree with nodes 20 and arcs 22 representing a basic or general version of a completeness graph 12 for the topic of determining, for example, whether an individual qualifies to receive benefits under the CalFresh benefit program. Each node 20 contains a condition or state that in this example is expressed as a Boolean expression that can be answered in the affirmative or negative. The arcs 22 that connect each node 20 illustrate the dependencies between nodes 20. The combination of arcs 22 in the completeness graph 12 illustrates the various pathways to completion. A single arc 22 or combination of arcs 22 that result in a determination of "Done" represent a pathway to completion. As seen in FIG. 8, there are several pathways to completion. For example, one pathway to completion is where a negative (F) answer is given to the question of whether you are a US citizen 20a and a negative (F) answer is given to the question of whether you are a US permanent resident 20c. If these condition are false, the individual does not qualify for CalFresh benefits because under CalFresh rules you cannot claim benefits if you are neither a US Citizen or US permanent resident. In another example, if an individual is a US citizen and their net household income is less than 200% of the federal poverty level ("FPL"), then the individual qualifies to receive CalFresh benefits. Again, this is a separate set of CalFresh requirements.

As one can imagine given the complexities and nuances of the benefit program rules and regulations, many benefit program qualification determinations may contain completeness graphs 12 that have many nodes with a large number of pathways to completion. However, many branches or lines 22 within the completeness graph 12 can be ignored, for example, when certain questions internal to the completeness graph 12 are answered that logically eliminate other nodes 20 and arcs 22 within the completeness graph 12. The dependent logic expressed by the completeness graph 12 allows one to minimize subsequent questions based on answers given to prior questions. This allows a minimum question set that can be generated that can be presented to a user as explained herein.

Figure 9:
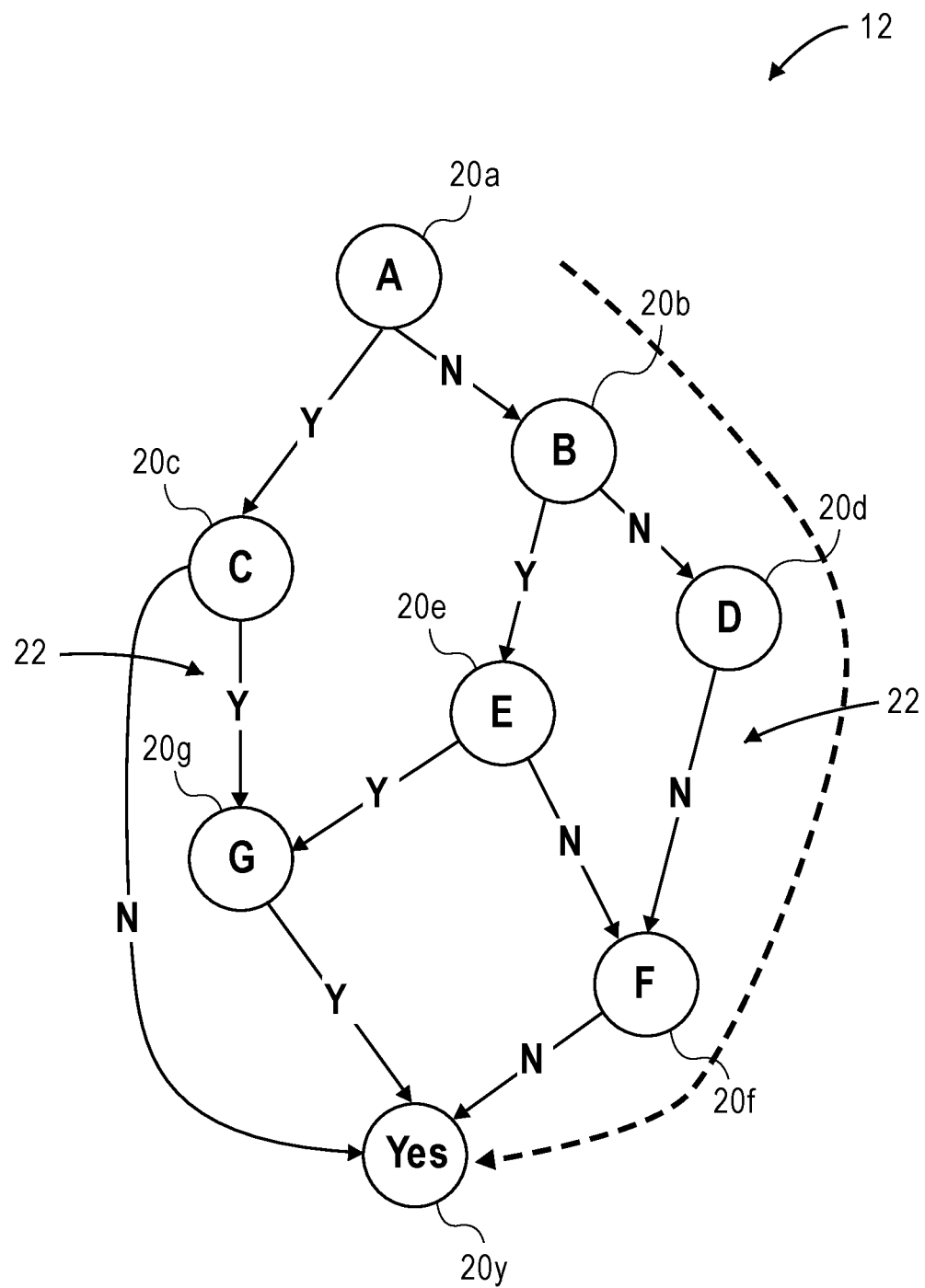
FIG. 9 illustrates a completeness graph according to another embodiment.

FIG. 9 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completeness graph 12 that is illustrated in FIG. 9 can be traversed through all possible paths from the start node 20a to the termination node 20y. By navigating various paths through the completeness graph 12 in a recursive manner one can determine each path from the beginning node 20a to the termination node 20y. The completeness graph 12 along with the pathways to completion through the graph can be converted into a different data structure or format.

Figure 10:
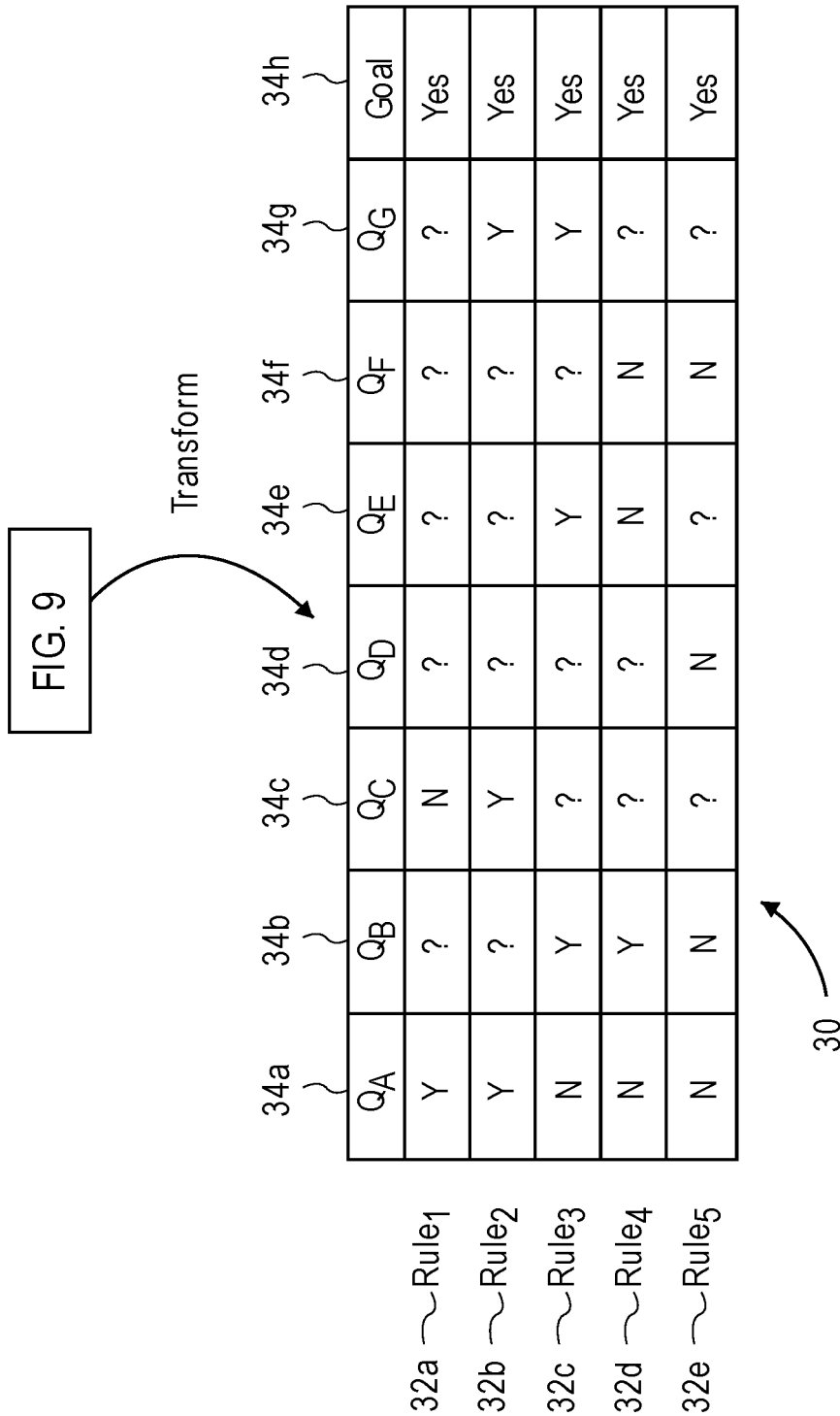
FIG. 10 illustrates a decision table based on or derived from the completeness graph of FIG. 9.

In the illustrated embodiment shown in FIG. 10, this different data structure or format is in the form of a decision table 30. In the illustrated example, the decision table 30 includes rows 32 (five rows 32*a-e* are illustrated) based on the paths through the completeness graph 12. In the illustrated embodiment, the columns 34*a-g* of the completeness graph represent expressions for each of the questions (represented as nodes A-G in FIG. 9) and answers derived from completion paths through the completeness graph 12 and column 34*h* indicates a conclusion, determination, result or goal 34*h* concerning a benefit program qualification determination, e.g., "Yes—you qualify for the benefit program" or "No—your do not qualify for the benefit program."

Referring to FIG. 10, each row 32 of the decision table 30 represents a benefit qualification rule. The decision table 30, for example, may be associated with a federal benefit qualification rule or a state benefit qualification rule (or private benefit qualification rule). In some instances, for example, a state benefit qualification rule may include the same decision table 30 as the federal benefit qualification rule. The decision table 30 can be used, as explained herein, to drive a personalized interview process for the user of benefit analysis system 102. In particular, the decision table 30 is used to select a question or questions to present to a user during an interview process. In this particular example, in the context of the completeness graph 12 from FIG. 9 converted into the decision table 30 of FIG. 10, if the first question presented to the user during an interview process is question "A" and the user answers "Yes" rows 32*c-e* may be eliminated from consideration given that no pathway to completion is possible. The benefit qualification rule associated with these columns cannot be satisfied given the input of "Yes" in question "A." Note that those cell entries denoted by "?" represent those answers to a particular question in a node that is irrelevant to the particular pathway to completion. Thus, for example, referring to row 34*a*, when an answer to $Q_A$ is "Y" and a path is completed through the completeness graph 12 by answering Question C as "N" then answers to the other questions in Nodes B and D-F are "?" since they are not needed to be answered given that particular path.

After an initial question has been presented and rows are eliminated as a result of the selection, a collection of candidate questions from the remaining available rows 32*a* and 32*b* is determined. From this universe of candidate questions from the remaining rows, a candidate question is selected. In this case, the candidate questions are questions $Q_C$ and $Q_G$ in columns 34*c*, 34*g*, respectively. One of these questions is selected and the process repeats until either the goal 34*h* is reached or there is an empty candidate list.

FIG. 11 illustrates another embodiment of a decision table 30. In this embodiment, the decision table 30 includes additional statistical data 36 associated with each rule (e.g., rules $R_1$ to $R_6$). For example, the statistical data 36 may represent a percentage or the like in which a particular demographic or category of user(s) satisfies this particular path to completion. The statistical data 36 may be mined from existing or current year benefit qualification determinations. The statistical data 36 may be obtained from a proprietary source of data such as benefit filing data owned by a company running a benefit analysis system 102. The statistical data 36 may be third party data that can be purchased or leased for use. For example, the statistical data 36 may be obtained from a benefit program or the like (e.g., CalFresh). In one aspect, the statistical data 36 does not necessarily relate specifically to the individual or individuals preparing the particular tax return. For example, the statistical data 36 may be obtained based on a number of individuals applying for benefit programs, which is then classified one or more classifications. For example, statistical data 36 can be organized with respect to age, employment status and type, income range (gross, AGI, or TI), deduction type, geographic location, and the like).

FIG. 5 illustrates two such columns 38*a*, 38*b* in the decision table 30 that contain statistical data 36 in the form of percentages. For example, column 38*a* (STAT1) may contain a percentage value that indicates individuals under the age of thirty-five where $Rule_1$ is satisfied. Column 38*b* (STAT2) may contain a percentage value that indicates individuals over the age of thirty-five where $Rule_1$ is satisfied. Any number of additional columns 38 could be added to the decision table 30 and the statistics do not have to relate to an age threshold or grouping. The statistical data 36 may be used, as explained in more detail below, by the benefit analysis system 102 to determine which of the candidate questions ($Q_A$-$Q_G$) should be asked to a user/individual. The statistical data 36 may be compared to one or more known benefit qualification data fields (e.g., age, income level, immigration status, geographic location, or the like) such that the question that is presented to the user is most likely to lead to a path to completion. Candidate questions may also be excluded or grouped together and then presented to the user to efficiently minimize benefit qualification interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the user/individual. Predictive models based on the statistical data 36 may be used to determine candidate questions.

Figure 12:
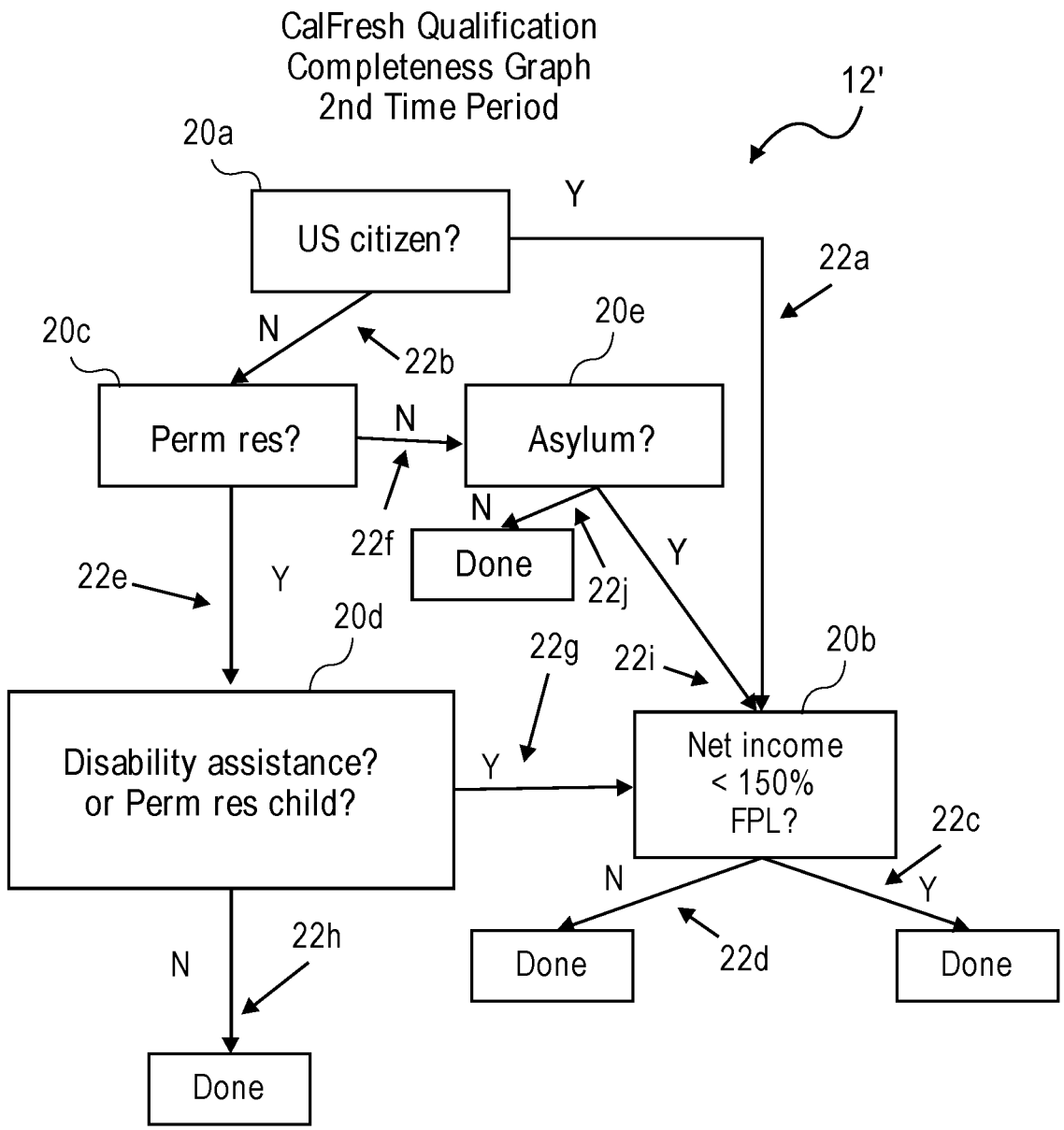

FIG. 12 illustrates a version of a benefit qualification completeness graph 12' for a second benefit qualification period (e.g., a later year). The benefit qualification completeness graph 12' is similar in many respects with the benefit qualification completeness graph 12 of FIG. 8 with three differences. As seen in FIG. 12, the permanent residency for five years requirement as represented by node 20*d* in FIG. 8 is no longer present in the benefit qualification completeness graph 12' in FIG. 12. This disappearance of this requirement in the second benefit qualification. May have been the result of a change in the CalFresh qualification rules and regulations. Similarly, the net family income requirement as represented by node 20*b* in FIG. 8 as seen in FIG. 8 has been reduced from 200% of FPL to 150% of FPL. Also, a new immigration status has appeared; the asylum status which is stored in node 20*e*. These changes are not uncommon occurrences as benefit rules and regulations do change and evolve over time. In the context of benefit qualification completeness graphs 12, 12', note how the larger structure of the tree largely remains intact except for the addition of node 20*e* and the changes to nodes 20*d* and 20*b*. Additional changes may occur beyond merely adding, removing or changing nodes from the benefit qualification completeness graph when comparing different benefit qualification years.

Often benefit qualification rules and regulations, and the like change from year to year. In such instances, the various nodes 20 and arcs 22 in the benefit qualification completeness graphs 12 may be modified from year-to-year. As one example, the reduction in the net also income may result in an individual not qualifying for CalFresh benefits in the second benefit qualification period corresponding to the completeness graph 12' in FIG. 12.

Figure 13:
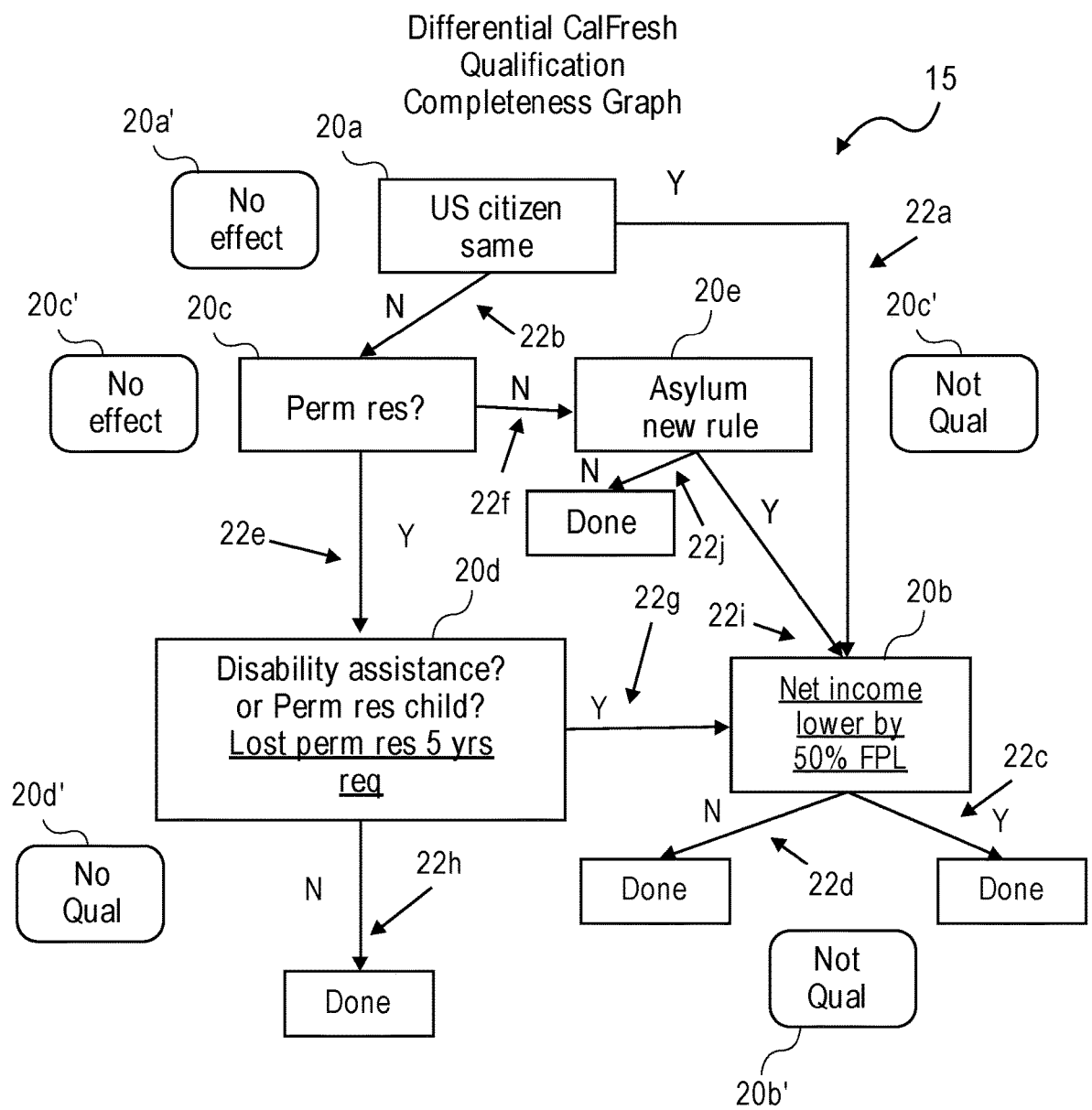
FIG. 13 illustrates a differential benefit qualification completeness graph that illustrates the differences between the values contained within the common nodes of the two respective benefit qualification completeness graphs depicted in FIGS. 8 and 12.

FIG. 13 illustrates a differential benefit qualification completeness graph 15 that has a similar hierarchy as benefit qualification completeness graphs 12, 12'. In addition to the nodes 20a to 20e in benefit qualification completeness graph 12', the differential benefit qualification completeness graph 15 contains differential nodes 20a', 20b', 20c', 20d', 20e', that each contain a value that corresponds to the differences in the Boolean value stored at that particular common node found in benefit qualification completeness graphs 12, 12'. More particularly, the value contained within each differential node 20a', 20b', 20c', 20d', 20e' of the differential benefit qualification completeness graph 15 represents the change in Boolean value at the particular node from the second benefit qualification period compared to the value at the same particular node from the first benefit qualification period. The differential benefit qualification completeness graph 15 also includes node 20e' for added node 20e. Thus, nodes 20d' and 20b' show that the individual no longer qualifies for CalFresh benefits in the second benefit qualification period. Nodes 20e and 20e' are uncommon nodes in that they are not shared within benefit qualification completeness graphs 12 and 12'.

Still referring to FIG. 13, each node 20b, 20d, 20e having a change is associated with a respective textual explanation that succinctly captures the difference in the particular node. For example, node 20b includes an explanation that "net income lower by 50% FPL." Node 20d includes an explanation that "lost permanent residency five year requirement." Node 20e includes an explanation 27c that "asylum new node."

The value of each differential node 20a', 20b', 20c', 20d', 20e' may be stored in a memory location that is mapped according the hierarchy of the differential benefit qualification completeness graph 15. In addition, portions of the text for each explanation 20b, 20d, 20e may be stored within respective memory locations that are tied to particular differential nodes 20b', 20d', 20e' within the differential benefit qualification completeness graph 15. For example, pointers or the like may direct a specific explanation node 20b, 20d, 20e to its corresponding differential node 20b', 20d', 20e', and 26j'. The particular wording of the explanation may change depending on the Boolean value contained within the differential nodes. For example, appropriate wording for the explanation 20b, 20d, 20e can be generated in response to the value (e.g., qualify/not qualify) of the corresponding differential node 20b', 20d', 20e'.

In one aspect, all or a portion of the text for an explanation 20b, 20d, 20e may be pre-generated and stored for later retrieval. The explanations 20b, 20d, 20e may include aspects that change depending on the value contained in the differential nodes 20b', 20d', 20e' of the differential benefit qualification completeness graph 15. In other embodiments, the explanations 20b, 20d, 20e may be generated in a natural language format using a natural language generator 16 114 (described herein in more detail).

Figure 14:
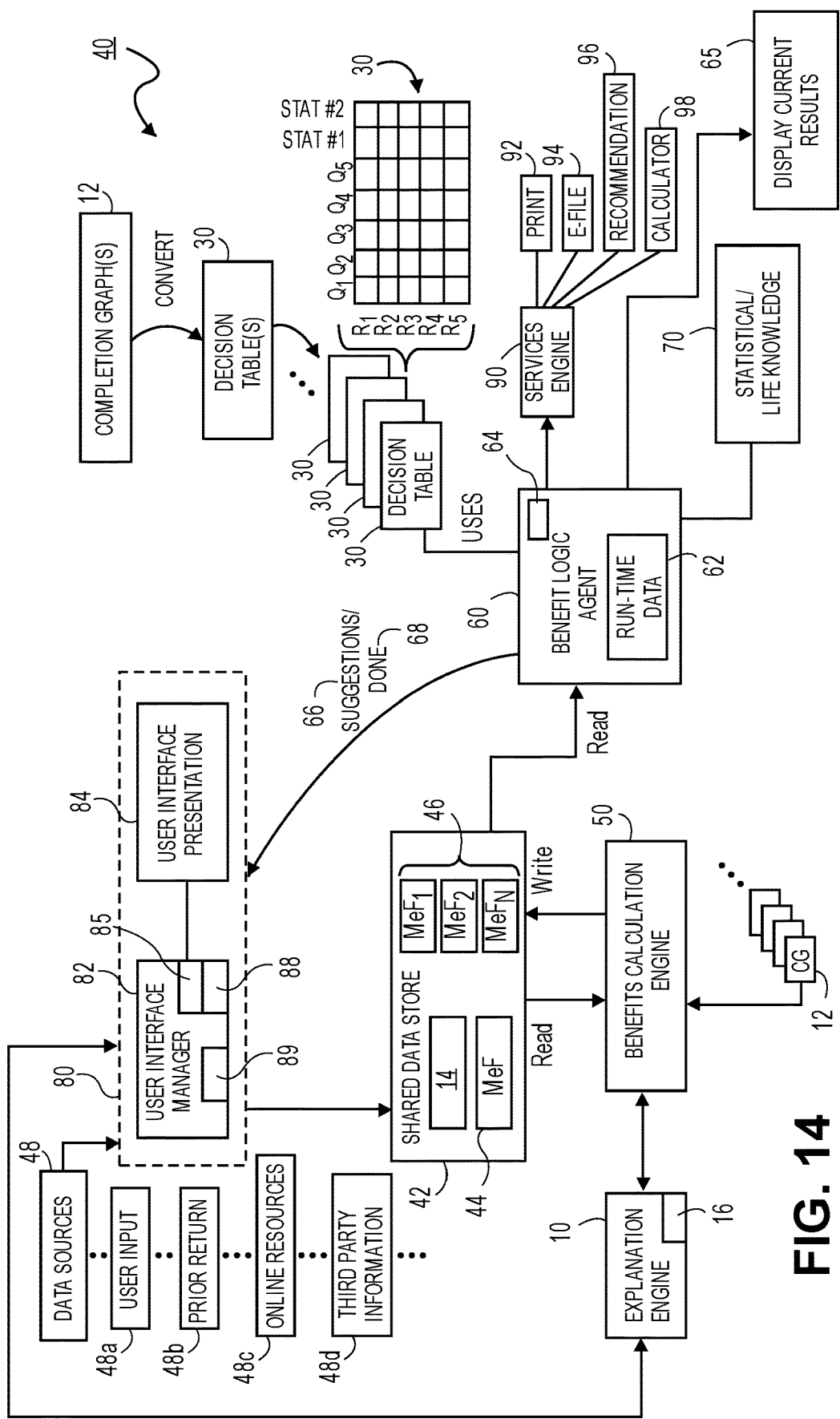
FIG. 14 is a schematic diagram depicting a system for determining benefit qualification status using rules and calculations based on a declarative data structures according to one embodiment.

FIG. 14 schematically illustrates a system 40 for determining benefit qualification status using rules and calculations based on a declarative data structures according to one embodiment. The system 40 include a shared data store 42 that contains therein a schema 44 or canonical model representative to the data fields utilized or otherwise required to determine benefit qualification status. The shared data store 42 may be a repository, file, or database that is used to contain the benefit-related data fields. The shared data store 42 is accessible by a computing device 104 as described herein (e.g., FIGS. 1 to 4). The shared data store 42 may be located on the computing device 104 running the benefit analysis system 102 or it may be located remotely, for example, in a cloud environment on another, remotely located computer.

The schemas 44 may vary depending on the different benefit programs. For example, CalFresh may have a benefit schema 44 that varies from California Head Start. Different regions or states within a single country may even have different schemas 44. The systems and methods described herein are not limited to a particular schema 44 implementation. The schema 44 may contain all the data fields required to determine qualification for benefit programs. This may include, for example, all fields required for any benefit application forms, and the like. Data may include text, numbers, and a response to a Boolean expression (e.g., True/False or Yes/No). As explained in more detail, the shared data store 42 may, at any one time, have a particular instance 46 of the schema 44 stored therein at any particular time. For example, FIG. 14 illustrates several instances 46 of the schema 44 (labeled as $SCH_1$, $SCH_2$, and SCHN). These instances 46 may be updated as additional data is input into the shared data store 42.

As seen in FIG. 14, the shared data store 42 may import data from one or more data sources 48. A number of data sources 48 may be used to import or otherwise transfer benefit qualification data to the shared data store 42. This may occur through a user interface control 80 as described herein or, alternatively, data importation may occur directly to the shared data store 42 (not illustrated in FIG. 14). The benefit qualification data may include personal identification data such as a name, address, or age. Benefit qualification data may also relate to, for example, details regarding an individual's employment during a preceding tax year. This may include, employer name, employer federal ID, dates of employment, and the like. Benefit qualification data may include residential history data (e.g., location of residence(s) in benefit qualification period (state, county, city, etc.) as well as type of housing (e.g., rental unit or purchased home). Benefit qualification data may also include dependent-related information such as the number of family members in a household including children. Benefit qualification data may pertain to sources of income, including both earned and unearned income as well. Benefit qualification data also include information that pertains to tax deductions or tax credits. Benefit qualification data may also pertain to medical insurance information. In some embodiments, benefit qualification data can be automatically imported into the shared data store 42 (e.g., using an application programming interface or "API").

User input 48a is also one type of data source 48. User input 48a may take a number of different forms. For example, user input 48a may be generated by a user using, for example, a input device such as keyboard, mouse, touchscreen display, voice input (e.g., voice to text feature), photograph or image, or the like to enter information manually into the benefit analysis system 102. For example, as illustrated in FIG. 14, user interface manager 82 contains an import module 89 that may be used to select what data sources 48 are automatically searched for benefit qualification data. Import module 89 may be used as a permission manager that includes, for example, user account numbers and related passwords. The UI control 80 enables what sources 48 of data are searched or otherwise analyzed for benefit qualification data. For example, a user may select prior year benefit qualification files 48b to be searched but not online resources 48c. The benefit qualification data may flow through the UI control 80 directly as illustrated in FIG. 14 or, alternatively, the benefit qualification data may be routed directly to the shared data store 42. The import module 89 may also present prompts or questions to the user via a user interface presentation 84 generated by the user interface manager 82. For example, a question or prompt may ask the user to confirm the accuracy of the data. For instance, the user may be asked to click a button, graphic, icon, box or the like to confirm the accuracy of the data prior to or after the data being directed to the shared data store 42. Conversely, the interface manager 82 may assume the accuracy of the data and ask the user to click a button, graphic, icon, box or the like for data that is not accurate. The user may also be given the option of whether or not to import the data from the data sources 48.

User input 48a may also include some form of automatic data gathering. For example, a user may scan or take a photographic image of a tax document (e.g., W-2 or 1099) that is then processed by the benefit analysis system 102 to extract relevant data fields that are then automatically transferred and stored within the data store 42. OCR techniques along with pre-stored templates of tax reporting forms may be called upon to extract relevant data from the scanned or photographic images whereupon the data is then transferred to the shared data store 42.

Another example of a data source 48 is a prior year benefit qualification files 48b. A prior year benefit qualification files 48b that is stored electronically can be searched and data is copied and transferred to the shared data store 42. The prior year benefit qualification files 48b may be in a proprietary format (e.g., .txf, .pdf) or an open source format. The prior year benefit qualification files 48b may also be in a paper or hardcopy format that can be scanned or imaged whereby data is extracted and transferred to the shared data store 42. In another embodiment, a prior year benefit qualification files 48b may be obtained by accessing a benefit agency database (e.g., CalFresh records).

An additional example of a data source 48 is an online resource 48c. An online resource 48c may include, for example, websites for the taxpayer(s) that contain benefit qualification data. For example, financial service providers such as banks, credit unions, brokerages, investment advisors typically provide online access for their customers to view holdings, balances, transactions. Financial service providers also typically provide year-end tax documents to their customers such as, for instance, 1099-INT (interest income), 1099-DIV (dividend income), 1099-B (brokerage proceeds), 1098 (mortgage interest) forms. The data contained on these tax forms may be captured and transferred electronically to the shared data store 42.

Of course, there are additional examples of online resources 48c beyond financial service providers. For example, many taxpayers may have social media or similar accounts. These include, by way of illustration and not limitation, Facebook, Linked-In, Twitter, and the like. User's may post or store personal information on these properties that may have tax implications. For example, a user's Linked-In account may indicate that a person changed jobs during a tax year. Likewise, a posting on Facebook about a new home may suggest that a person has purchased a home, moved to a new location, changed jobs; all of which may have possible tax ramifications. This information is then acquired and transferred to the shared data store 42, which can be used to drive or shape the interview process described herein. For instance, using the example above, a person may be asked a question whether or not she changed jobs during the year (e.g., "It looks like you changed jobs during the past year, is this correct?"). Additional follow-up questions can then be presented to the user.

Still referring to FIG. 14, another data source 48 includes sources of third party information 48d that may be accessed and retrieved. For example, credit reporting bureaus contain a rich source of data that may implicate one or more benefit programs. For example, credit reporting bureaus may show that a taxpayer has taken out a student loan or home mortgage loan that may be the source of possible benefit program qualification. Other examples of sources of third party information 48d include government databases. For example, the state department of motor vehicles may contain information relevant to some benefit programs (e.g., electric car rebates). Other government databases that may be accessed include the IRS (e.g., IRS tax return transcripts), and state taxing authorities. Third party resources 48d may also include one of the state-based health insurance exchanges or the federal health insurance exchange (e.g., www.healthcare.gov).

Referring briefly to FIG. 1, the benefit analysis system 102 including the system 40 of FIG. 14 is executed by the server computing device 104. Referring back to FIG. 14, the benefit analysis system 102 includes a benefit calculation engine 50 that performs one or more benefit qualification status determinations based on the available data at any given instance within the schema 44 in the shared data store 42. The benefit calculation engine 50 may determine a benefit program qualification or disqualification. The benefit calculation engine 50 utilizes the one or more benefit qualification completeness graphs 12 as described previously in the context of FIGS. 8 to 13. In one embodiment, a series of different completeness graphs 12 are used for respective benefit program qualification determinations. These different completeness graphs 12 may be glued together or otherwise compiled as a composite completeness graph 12 to obtain a total benefit amount based on the information contained in the shared data store 42. The benefit calculation engine 50 reads the most current or up to date information contained within the shared data store 42 and then performs benefit qualification status determinations. Updated benefit qualification status values are then written back to the shared data store 42. As the updated benefit qualification status values are written back, new instances 46 of the canonical model 46 are created. The benefit qualification status determinations performed by the benefit calculation engine 50 may include the calculation of an overall benefit amount. The benefit qualification status determinations may also include per program determinations used to determine an overall benefit amount.

Still referring to FIG. 14, the system 40 includes a benefits logic agent (BLA) 60. The BLA 60 operates in conjunction with the shared data store 42 whereby updated benefit qualification data represented by instances 46 are read to the BLA 60. The BLA 60 contains run time data 62 that is read from the shared data store 42. The run time data 62 represents the instantiated representation of the canonical benefit schema 44 at runtime. The BLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form a Drools expert engine. Other declarative rules engines 64 may be utilized and a Drools expert rule engine 64 is provided as one example of how embodiments may be implemented.

The BLA 60 may be implemented as a dedicated module contained within or executed in connection with the benefit analysis system 102.

As seen in FIG. 14, The BLA 60 uses the decision tables 30 to analyze the run time data 62 and determine whether a benefit qualification status determination is complete. Each decision table 30 created for each benefit program or sub-topic is scanned or otherwise analyzed to determine completeness for each particular benefit program or sub-topic. In the event that completeness has been determined with respect to each decision table 30, then the rule engine 64 outputs a "done" instruction 68 to the UI control 80. If the rule engine 64 does not output a "done" instruction 68 that means there are one or more benefit programs or sub-topics that are not complete, which, as explained in more detail below presents interview questions to a user for answer. The BLA 60 identifies a decision table 30 corresponding to one of the non-complete benefit programs or sub-topics and, using the rule engine 64, identifies one or more non-binding suggestions 66 to present to the UI control 80. The non-binding suggestions 66 may include a listing or compilation of one or more questions (e.g., $Q_1$ to $Q_5$ as seen in FIG. 14) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$ to $R_5$) in a decision will most likely lead to a path to completion. As part of this ranking process, statistical information such as the STAT1, STAT2 percentages as illustrated in FIG. 5 may be used to augment or aid this ranking process. Questions may also be presented that are most likely to increase the confidence level of the calculated benefit qualification status or refund amount. In this regard, for example, those questions that resolve data fields associated with low confidence values may, in some embodiments, be ranked higher. Predictive modeling based on statistical data 36 using any suitable data such as prior year benefit qualification files, demographic information, financial information and the like may be used as part of this ranking process.

The BLA 60 may also receive or otherwise incorporate information from a statistical/life knowledge module 70. The statistical/life knowledge module 70 contains statistical or probabilistic data related to the taxpayer. For example, statistical/life knowledge module 70 may indicate that individuals residing within a particular zip code are more likely to be homeowners than renters. The BLA 60 may use this knowledge to weight particular benefit programs or questions related to these benefit programs. For example, in the example given above, questions relevant to home mortgage assistance programs may be promoted or otherwise given a higher weight. The statistical knowledge may apply in other ways as well. For example, individuals' professions may be associated with transactions that may affect benefit qualification status. For instance, an individual may list their occupation as "teacher." The statistic/life knowledge module 70 may contain data that shows that a large percentage of teachers have retirement accounts and in particular 403(*b*) retirement accounts. This information may then be used by the BLA 60 when generating its suggestions 66. For example, rather than asking generically about retirement accounts, the suggestion 66 can be tailored directly to a question about 403(b) retirement accounts.

The data that is contained within the statistic/life knowledge module 70 may be obtained by analyzing aggregate benefit qualification data of a large body of individuals. For example, entities having access to tax filings may be able to mine their own proprietary data to establish connections and links between various individual characteristics and benefit program qualification determinations. This information may be contained in a database or other repository that is accessed by the statistic/life knowledge module 70. This information may be periodically refreshed or updated to reflect the most up-to-date relationships. Generally, the data contained in the statistic/life knowledge module 70 is not specific to a particular individual but is rather generalized to characteristics shared across a number of individuals although in other embodiments, the data may be more specific to an individual.

Still referring to FIG. 14, the UI controller 80 encompasses a user interface manager 82 and a user interface presentation or user interface 84. The user interface presentation 84 is controlled by the interface manager 82 may manifest itself, typically, on a visual screen or display 114 that is presented on a computing device 106 (seen, for example, in FIG. 4). The computing device 102 may include the display of a computer, laptop, tablet, mobile phone (e.g., Smartphone), or the like. Different user interface presentations 84 may be invoked using a UI generator 85 depending, for example, on the type of display 114 that is utilized by the computing device 106. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 106. The nature of the interface presentation 84 may not only be tied to a particular computing device 106 but different users may be given different interface presentations 84. For example, an individual that is over the age of 60 may be presented with an interview screen that has larger text or different visual cues than a younger user.

The user interface manager 82, as explained previously, receives non-binding suggestions from the BLA 60. The non-binding suggestions may include a single question or multiple questions that are suggested to be displayed to the individual via the user interface presentation 84. The user interface manager 82, in one aspect of the invention, contains a suggestion resolution element 88, is responsible for resolving of how to respond to the incoming non-binding suggestions 66. For this purpose, the suggestion resolution element 88 may be programmed or configured internally. Alternatively, the suggestion resolution element 88 may access external interaction configuration files. Additional details regarding configuration files and their use may be found in U.S. patent application Ser. No. 14/206,834, which is incorporated by reference herein.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may be pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on-the-fly during runtime.

As seen in FIG. 14, the UI controller 80 interfaces with the shared data store 42 such that data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the benefit analysis system 102 using an input device that is associated with the computing device 106. For example, an individual may use a mouse, finger tap, keyboard, stylus, voice entry, or the like to respond to questions. The individual may also be asked not only to respond to questions but also to include dollar amounts, check or un-check boxes, select one or more options from a pull down menu, select radio buttons, or the like. Free form text entry may also be request of the individual. For example, with regard to dependent children, the individual may be prompted to provide more details about the dependent children to satisfy requirements set by a particular benefit program.

Still referring to FIG. 14, in one aspect, the BLA 60 outputs a current benefit qualification result 65 which can be reflected on a display 114 of a computing device 106. For example, the current benefit qualification result 65 may illustrate a certain number of qualified benefit programs. The current benefit qualification results 65 may also illustrate various other intermediate calculations or operations used to determine benefit qualification status. For example, different discrete topics such as Adjusted Gross Income may be illustrated. This information may be displayed contemporaneously with other information, such as user input information, or user interview questions or prompts or even narrative explanations as explained herein.

The BLA 60 also outputs a benefit qualification data that can be used in a variety of ways. For example, the system 40 includes a services engine 90 that is configured to perform a number of tasks or services for the individual. For example, the services engine 90 can include a printing option 92. The printing option 92 may be used to print a summary of qualified and not qualified benefit programs, completed benefit program application forms, and the like. The services engine 90 may also electronically file 94 or e-file a benefit program application with a benefit program. Whether a paper or electronic application is filed, data from the shared data store 42 required for particular benefit program application forms, and the like is transferred over into the desired format. The services engine 90 may also make one or more recommendations 96 based on the runtime data 62 contained in the BLA 60. For instance, the services engine 90 may identify that an individual will not qualify for a benefit program because they have not had a job interview in the last 90 days, and may recommend to the individual to seek out job interviews. The services engine 90 may also include a calculator 98 that can be used to calculate various intermediate calculations used as part of the overall benefit qualification algorithm. The calculator 98 can also be used to estimate benefit qualification status based on certain changed assumptions (e.g., how would my benefit qualification change if I was married and had a dependent child?). The calculator 98 may also be used to compare analyze differences between tax years.

By using benefit qualification completeness graphs 12 to drive benefit qualification status determinations, the year-over-year benefit qualification completeness graphs 12 can be used to readily identify differences and report the same to a user. Benefit qualification completeness graphs 12 from non-continuous years may also be compared in the same manner. In addition, the benefit qualification completeness graph 12 may include a calculation/Boolean determination that reflects the determination of benefit qualification status according the laws and regulations that will be in effect in a future time period. For example, many times, it is known well in advance about certain benefit qualification rule and regulation changes that have been enacted but will not go into effect until some future date. Benefit qualification completeness graphs 12 for such a future state can be developed and utilized by the individual to engage in benefit qualification planning. For example, it may be preferable to defer certain benefit qualification impacting events until a later date when benefit qualification rules and regulations are more favorable. Conversely, such future benefit qualification completeness graphs may be used to recommend accelerating certain activities into a current benefit qualification year to gain a benefit. Differences can be found using commonly used graph isomorphism algorithms over the two respective benefit qualification completeness graphs 12 to automatically generate the differential benefit qualification completeness graph 15. Topological differences between the nodes or sub-nodes within the respective benefit qualification completeness graphs 12 can be identified automatically by systematically traversing each node or sub-node in a recursive manner.

Referring to FIG. 14, the system includes an explanation engine 10 that operates in connection with the benefit analysis system 102 to generate a narrative explanation from the one or more explanations associated with a particular benefit program and associated nodes 20*a*, 20*b*, 20*c*, 20*d*, 20*e*, 20*a'*, 20*b'*, 20*c'*, 20*d'*, 20*e'* (illustrated in FIGS. 8, 12 and 13). To generate the narrative explanation for a node 20*a*, 20*b*, 20*c*, 20*d*, 20*e*, 20*a'*, 20*b'*, 20*c'*, 20*d'*, 20*e'* and the associated benefit program, the explanation engine 10 extracts the particular narrative associated with the node 20*a*, 20*b*, 20*c*, 20*d*, 20*e*, 20*a'*, 20*b'*, 20*c'*, 20*d'*, 20*e'* or benefit program. For example, a "cap" function and associated node may be associated with an explanation of "value exceeds cap." This brief explanation can be combined with a stored explanation or narrative that is associated with the particular functional node 20*a*, 20*b*, 20*c*, 20*d*, 20*e*, 20*a'*, 20*b'*, 20*c'*, 20*d'*, 20*e'* within the benefit qualification completeness graph 12. For example, the functional node 26 paired with the stored "cap" function 28 gives a contextual tax explanation in that is more than merely "value exceeds cap." For instance, a pre-stored narrative associated with the particular functional node 20 having to do with the child tax credit within the benefit qualification completeness graph 12 may be a complete statement or sentence such as "You do not qualify for CalFresh because your income is too high." In other embodiments, the pre-stored narrative may be only a few words or a sentence fragment. In the above example, the pre-stored narrative may be "income too high." The narrative may also explain how this particular benefit program or sub-topic changes over different benefit qualification periods as explained in the context of FIGS. 8, 12 and 13. For example, the narrative may include "the income Is lowered by 25%." A particular functional node 20 may have multiple pre-stored narratives. The particular narrative(s) that is/are associated with a particular functional node 20 may be stored in entries 14 in a memory, data store or database such as data store 42 of FIG. 14. For example, with reference to FIG. 14, data store 42 contains the pre-stored narratives that may be mapped, pointed to, or otherwise tagged to particular functional nodes 20 contained within the benefit qualification completeness graphs 12. The locations or addresses of the various functional nodes 20 can be obtained using the benefit qualification completeness graphs 12.

These stored entries 14 can be recalled or extracted by the explanation engine 10 and then displayed to a user on a display 114 of a computing device 106. For example, explanation engine 10 may interface with the UI control 80 in two-way communication such that a user may be ask the benefit analysis system 102 why a particular benefit qualification status determination has been made by the system 40. For instance, the user may be presented with an on-screen link, button, or the like that can be selected by the user to explain to the user why a particular benefit qualification status determination was made by the benefit analysis system 102. For example, in the context of FIG. 12 described herein, a user may see that they no longer qualify for CalFresh on the screen of the computing device 106. The individual may be interested in why they no longer qualify. As one example, the initial explanation provided to the user may be "you don't qualify because your income is too high." This explanation may be associated with, for example, function node 20b in FIG. 12. In some instances, a user is able to further "drill down" with additional questions to gain additional explanatory detail. This additional level of detailed explanations is possible by retracing the benefit qualification completeness graphs 12 to identify a predecessor or upstream functional node 20. In the context of the example listed above, a user may not be satisfied and may want additional explanation. In this instance, for example, the word "income" may be highlighted or linked with a hyperlink. A user clicking on this would then be provided with additional explanation on the detail regarding CalFresh qualification. In this example, the user may be provided with "CalFresh qualification requires net household income to be less than 150% of FPL. In your situation, the net household income exceeded the cap." This particular explanation may be associated with the predecessor function node 20b in FIG. 8. Additional details may be provided by further retracing, in a backwards fashion, the benefit qualification completeness graph 12.

With reference to FIG. 14, the explanation engine 10 may also automatically generate explanations that are then communicated to the user interface manager 80. The automatically generated explanations may be displayed on a display 114 associated with the computing device 106. In some embodiments, the explanations may be contemporaneously displayed alongside other benefit qualification data and/or determinations. For example, as a user inputs their information into the benefit analysis system 102 and determinations are automatically updated, explanations may be automatically displayed to the user. These explanations maybe displayed in a side bar, window, panel, pop-up (e.g., mouse over), or the like that can be followed by the user. The explanations may also be fully or partially hidden from the user which can be selectively turned on or off as requested by the user.

In one aspect of the invention, the choice of what particular explanation will be displayed to a user may vary. For example, different explanations associated with the same function node 20 may be selected by the explanation engine 10 for display to a user based on the user's experience level. A basic user may be given a general or summary explanation while a user with more sophistication may be given a more detailed explanation. A professional user such as a benefits specialist may be given even more detailed explanations.

In some embodiments, the different levels of explanation may be tied to product types or codes. These may be associated with, for example, SKU product codes. For example, a free edition of the benefit analysis system 102 may little or no explanations. In a more advanced edition (e.g., "Deluxe Edition" or "Home and Business Edition"), additional explanation is provided. Still more explanation may be provided in the more advanced editions of the benefit analysis system 102 (e.g., "Premier edition"). Version of the benefit analysis system 102 that are developed for benefit professionals may provide even more explanation.

In still other embodiments a user may be able to "unlock" additional or more detailed explanations by upgrading to a higher edition of benefit analysis system 102. Alternatively, a user may unlock additional or more detailed explanations in an a la carte manner for payment of an additional fee. Such a fee can be paid through the benefit analysis system 102 itself using known methods of payment.

The explanation engine 10 in FIG. 14 also includes a natural language generator 16 that converts fragments, expressions or partial declaratory statements into natural language expressions that are better understood by users. The natural language expressions may or may not be complete sentences but they provide additional contextual language to the more formulaic, raw explanations that may be tied directly to the explanation associated with a function node 20. For example, a brief explanation extracted by the explanation engine 10 which indicates that the individual does not qualify for CalFresh because their net household income is too high is then subject to post-processing to convert the same into a more understandable sentence that can be presented to the user. The user is provided with a natural language explanation that is more readily understood by users (e.g., "You are not eligible for the CalFresh program because your net household income is above the limit set by CalFresh.")

In one aspect of the invention, the natural language generator 16 may rely on artificial intelligence or machine learning such that results may be improved. For example, the explanation engine 10 may be triggered in response to a query that a user has typed into a free-form search box within the benefit analysis system 102. The search that has been input within the search box can then be processed by the explanation engine 10 to determine what benefits program determination the user is inquiring about and then generate an explanatory response.

Narrative explanations and associated sub-explanations can be constructed as an explanation tree with the root of the tree representing a particular benefit program qualification determination. The explanation trees are readily constructed based on the function nodes 20 contained within the benefit qualification completeness graph 12. For example, one is able to "drill down" into more detailed explanations by walking up the directed graph that forms the benefit qualification completeness graph 12. For example, the initial explanation that is displayed on the screen may be associated with node D of the benefit qualification completeness graph 12 of FIG. 3. By selecting a hyperlink, a predecessor node (e.g., node B) is used to generate the narrative explanation. Yet another predecessor node (node A) can also be used to generate the narrative explanation. In this manner, explanations can be presented to the user in a recursive manner by reversely traversing the benefit qualification completeness graph 12. Conversely, walking progressively down the benefit qualification completeness graph 12 shows how one node 20 affects other downstream nodes 20.

Note that the system may also work with partial benefit qualification data for the current benefit qualification year and does not necessarily require that the current year benefit qualification data be complete. For example, explanations may be provided to the user during the interview or data capture process with explanations reflected the then-current state of data for the current benefit qualification year. In this regard, explanations may be provided to the user in real-time or near real-time as data is input by the user as part of the interview process or is automatically captured and stored within, for example, data store 42. Likewise, the invention will also work on completed benefit qualification data for the current year which will provide the most accurate explanations for differences in benefit program qualification over different benefit qualification periods.

Encapsulating the benefit qualification rules and regulations within benefit qualification completeness graphs 12 results in much improved testability and maintainability of the benefit analysis system 102. Software bugs can be identified more easily when the benefit qualification completeness graphs 12 are used because such bugs can be traced more easily. In addition, updates to the benefit qualification completeness graphs 12 can be readily performed when benefit qualification rules or regulations change with less effort.

Further, the degree of granularity in the explanations that are presented to the user can be controlled. Different levels of details can be presented to the user. This can be used to tailor the benefit analysis system 102 to provide scalable and personalized benefit qualification explanations to the user. The narrative explanations can be quickly altered and updated as needed as well given that they are associated with the completeness graphs 12 and are not hard coded throughout the underlying software code for the benefit analysis system 102.

Note that one can traverse the benefit qualification completeness graphs 12 in any topologically sorted order. This includes starting at a node 20 and working forward through the benefit qualification completeness graph 12. Alternatively, one can start at the final or terminal node 20 and work backwards (e.g., recursively). One can also start at in intermediate node 20 and traverse through the directed graph in any order. By capturing the benefit qualification rules and regulations in the completeness graph 12, targeted determinations can be made for benefit program qualification or related sub-topics. Of course, there are many such benefit qualification completeness graphs 12 for the various benefit programs or sub-topics. This has the added benefit that various benefit programs or sub-topics can be isolated and examined separately in detail and can be used to explain intermediate operations and determinations that are used to generate a final benefit qualification status. For example, custom-created benefit calculators on various benefit aspects can be generated (e.g., income, immigration status, and the like).

While the benefits calculation engine 50, the benefits logic agent 60 and explanation engine 110 are depicted in FIG. 14 as separate components, in other embodiments, the benefits calculation engine 50, the benefits logic agent 60 and explanation engine 110 may be all part of one component. For instance, the benefits logic agent 60 and explanation engine 110 may be parts of the benefits calculation engine 50.

Having described various aspects of benefit analysis systems 102 according to various embodiments, computer-implemented methods for providing notice when there is a benefit program qualification status change using a benefit analysis system 102 will now be described. The methods also include modifying a completeness graph based on a benefit program qualification requirement change, and running profiles corresponding to individuals against the modified completeness graph.

Figure 15:
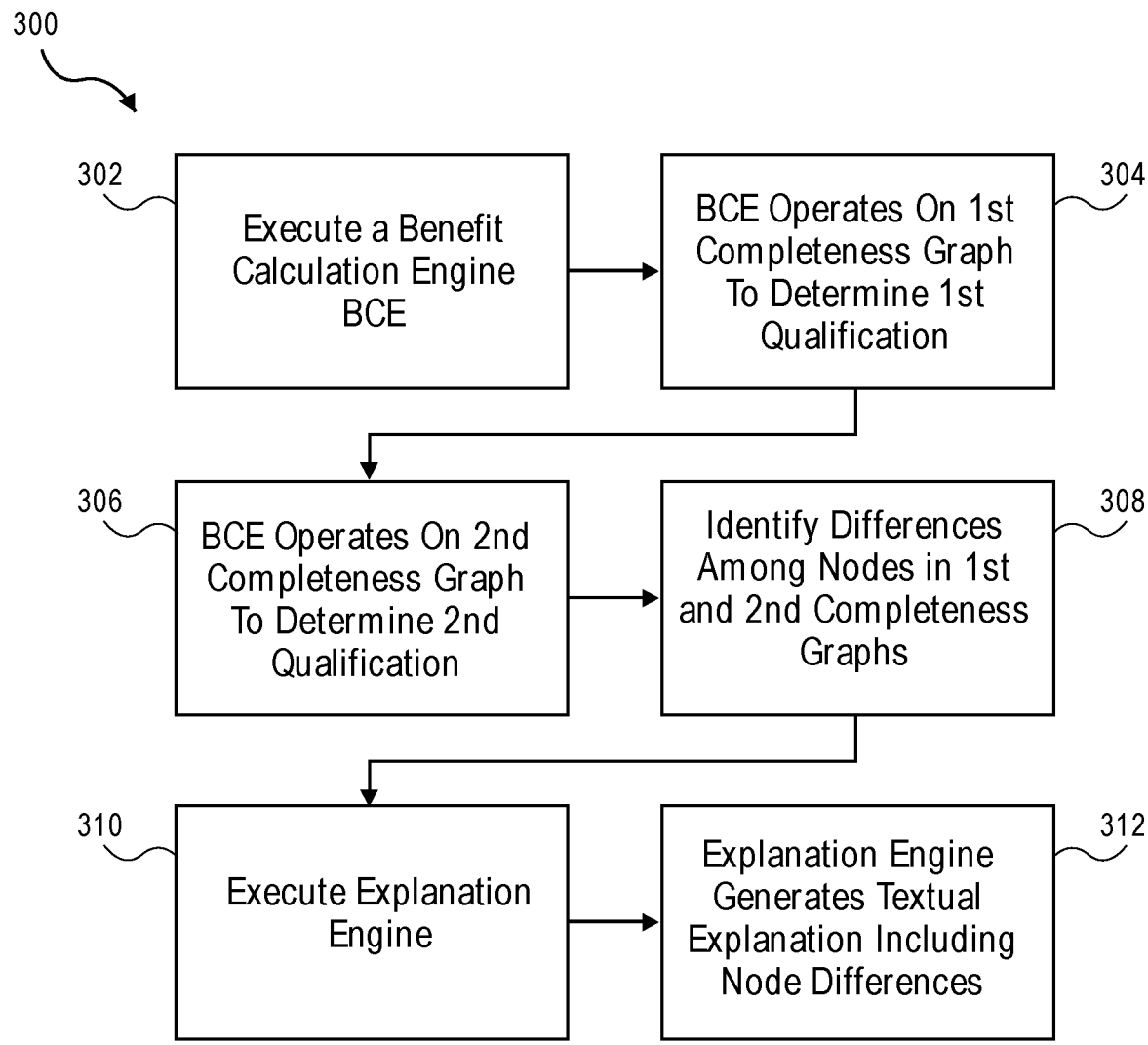
FIGS. 15 and 16 are flow charts depicting computer-implemented methods/algorithms for generating an explanation for a benefit qualification status change over different benefit qualification periods using benefits analysis systems according to various embodiments.

FIG. 15 depicts a computer-implemented method/algorithm 300 for generating an explanation for a benefit qualification status change over different benefit qualification periods according to one embodiment. The method 300 may be implemented using a benefit analysis system (e.g., 102) running on a hardware system (e.g., 100, 100', 100") depicted in FIGS. 1 to 6.

At step 302, the system 100, 100', 100" (in particular, the server computing device 104) executes a benefit calculation engine 110.

At step 304, the system 100, 100', 100" (in particular, the benefit calculation engine 110) operates on a first benefit completeness graph from a first benefit qualification period, which may be a previous year. The first benefit completeness graphs describes data dependent benefit qualification operations comprising a plurality of interconnecting functional nodes connected by one of a plurality of functions. As used in this application, and engine "operating on a completeness graph" includes but is not limited to, running the completeness graph using data (e.g., profile).

At step 306, the system 100, 100', 100" (in particular, the benefit calculation engine 110) operates on a second benefit completeness graph from a second benefit qualification period, which may be the current year. The second benefit completeness graphs describes data dependent benefit qualification operations comprising a plurality of interconnecting functional nodes connected by one of a plurality of functions. The first and second benefit completeness graphs are different in at least one respect (see e.g., FIGS. 8 and 12).

At step 308, the system 100, 100', 100" (in particular, the benefit calculation engine 110) identifies the differences between the nodes in the first and second benefit completeness graphs. In one embodiment, this identification of the differences may result in formation of a differential benefit qualification completeness graph 15 as shown in FIG. 13

At step 310, the system 100, 100', 100" (in particular, the server computing device 104) executes an explanation engine 10.

At step 312, the system 100, 100', 100" (in particular, the explanation engine 10) generates textual explanation, which includes a description of the differences between the nodes in the first and second benefit completeness graphs. In one embodiment, the textual explanations are derived from nodes (e.g., 20b, 20d, 20e) in differential benefit qualification completeness graph 15 as shown in FIG. 13.

After the explanations are generated, they can be provided to a user via a user interface (e.g., a visual or audio user interface). The explanations can be generated at many different levels of complexity including a snapshot, a change between two completeness graphs, and year-over-year.

Figure 16:
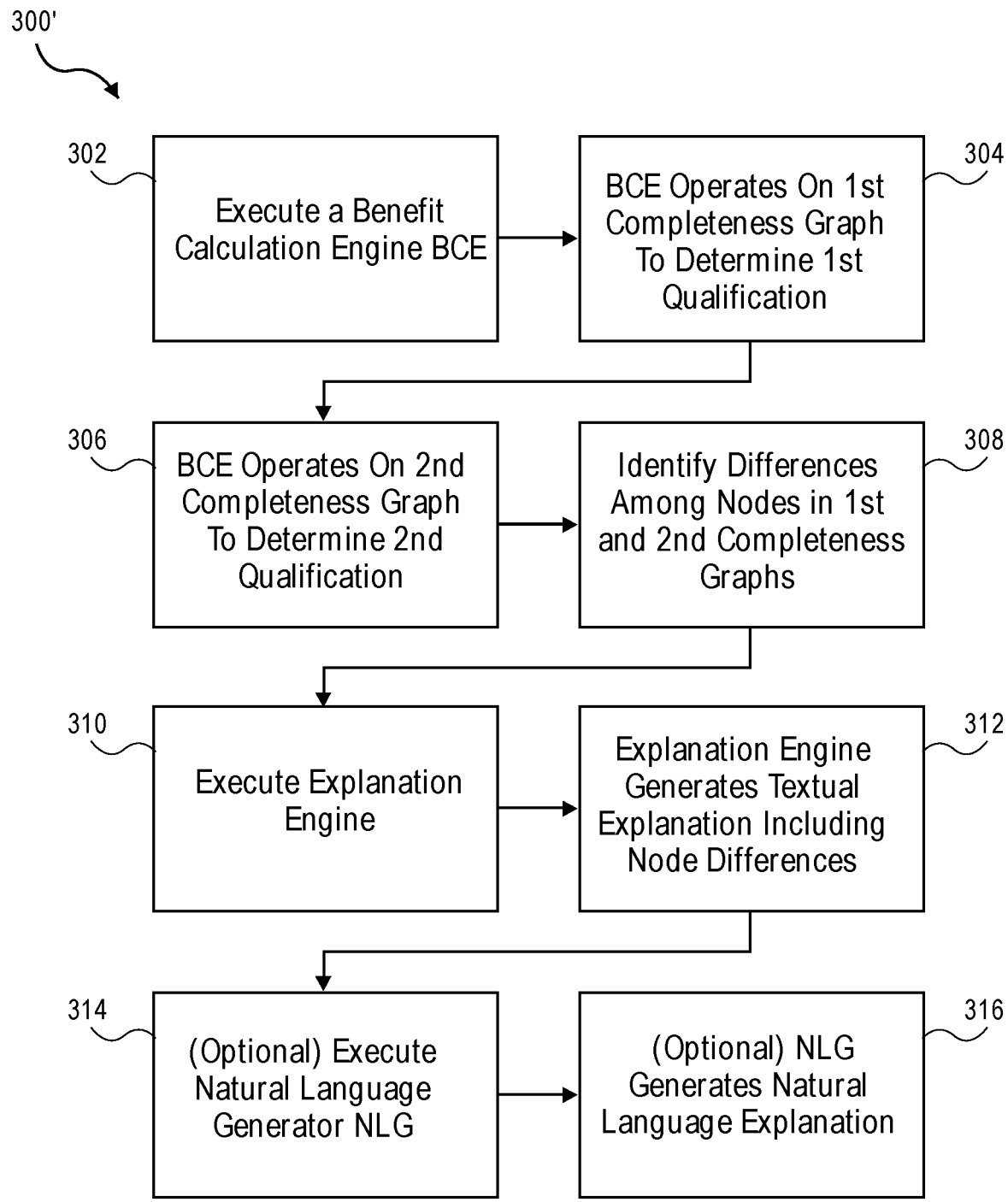

FIG. 16 depicts another computer-implemented method/algorithm 300' for generating an explanation for a benefit qualification status change over different benefit qualification periods according to another embodiment. The method 300' may be implemented using a benefit analysis system (e.g., 102) running on a hardware system (e.g., 100, 100', 100") depicted in FIGS. 1 to 6. Steps 302, 304, 306, 308, 310, 312 of the method 300' depicted in FIG. 16 are identical to corresponding steps 302, 304, 306, 308, 310, 312 of the method 300 depicted in FIG. 15.

However, in method 300' steps 314 and 316 are appended after step 312. At step 314, the system 100, 100', 100" (in particular, the server computing device 104) executes an natural language generator 16. At step 316, the system 100, 100', 100" (in particular, the natural language generator 16) generates a natural language explanation as described above to better communicate with the user.

Providing explanations corresponding to benefit qualification status changes can help individuals with their spending and saving decisions. It can also help individuals with other life decisions that may affect their benefit qualification status. Providing explanations also improves the user experience with the system by empowering individuals to understand their benefit qualification status.

The embodiments described herein improve the efficiency of computing devices used for providing explanations regarding benefit qualification status change. The use of completeness graphs and schema, along with the prioritization algorithms described herein, increases processing efficiency and reduces memory footprint size. The embodiments described herein address the computer centric issue of analyzing multiple benefit completeness graphs using various engines that run through completeness graph data structures. The embodiments described herein include transforming user data into profiles, benefit qualification rules and regulations into completeness graphs, profiles, completeness graphs, and qualification status into schema, and benefit program qualification requirement change into explanations regarding benefit qualification status changes. The embodiments described herein also improve the technical fields of information storage, information processing, and computer human interactions.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 220 performs steps or executes program instructions 212 within memory 210 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

Although particular embodiments have been shown and described, it should be understood that the above discussion is not intended to limit the scope of these embodiments. While embodiments and variations of the many aspects of embodiments have been disclosed and described herein, such disclosure is provided for purposes of explanation and illustration only. Thus, various changes and modifications may be made without departing from the scope of the claims.

Where methods and steps described above indicate certain events occurring in certain order, those of ordinary skill in the art having the benefit of this disclosure would recognize that the ordering of certain steps may be modified and that such modifications are in accordance with the variations of the disclosed embodiments. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computer-implemented method for generating an explanation for a benefit qualification status change over different benefit qualification periods, the method comprising:

a computing device executing a benefit calculation engine, the benefit calculation engine operating on a first benefit completeness graph from a first benefit qualification period to perform a first benefit qualification status determination, the benefit calculation engine operating on a second benefit completeness graph from a second benefit qualification period and different in at least one respect from the first benefit completeness graph to perform a second benefit qualification status determination, the first and second benefit completeness graphs each comprising rules and regulations of its respective benefit qualification period implemented as data dependent benefit qualification operations comprising a plurality of interconnecting functional nodes connected by one of a plurality of functions;

the computing device identifying differences among nodes within the first benefit completeness graph and the second benefit completeness graph;

the computing device executing an explanation engine associated with the benefit calculation engine to generate a textual explanation identifying a difference between the first benefit qualification status determination and the second benefit qualification status determination based on one or more differences among the nodes;

the computing device presenting the textual explanation identifying the difference between the first benefit qualification status determination and the second benefit qualification status determination based the one or more differences among the nodes to a user interface along with a link allowing a user to request an additional explanation; and in response to a request for the additional explanation, the computing device recursively traversing nodes of the completeness graphs to generate a further textual explanation regarding the difference between the first benefit qualification status determination and the second benefit qualification status determination based the one or more differences among the nodes.

2. The computer-implemented method of claim 1, wherein the second benefit completeness graph differs from the first completeness graph based on an addition of one or more additional interconnecting functional nodes.

3. The computer-implemented method of claim 2, wherein the computing device executes an explanation engine associated with the benefit calculation engine to generate a textual explanation of one or more differences as a result of the one or more additional interconnecting functional nodes.

4. The computer-implemented method of claim 1, wherein the second benefit completeness graph differs from the first completeness graph based on a deletion of one or more additional interconnecting functional nodes.

5. The computer-implemented method of claim 4, wherein the computing device executes an explanation engine associated with the benefit calculation engine to generate a textual explanation of one or more differences as a result of the one or more deleted interconnecting functional nodes.

6. The computer-implemented method of claim 1, wherein the second benefit completeness graph differs from the first completeness graph based on different functions connecting similar nodes.

7. The computer-implemented method of claim 1, wherein the first benefit qualification period comprises a current benefit qualification year and the second benefit qualification period comprises an immediately preceding benefit qualification year.

8. The computer-implemented method of claim 7, wherein the first benefit completeness graph comprises estimates for the current benefit qualification year.

9. The computer-implemented method of claim 1, wherein the first benefit qualification period comprises a future benefit qualification year and the second benefit qualification period comprises a current or past benefit qualification year.

10. The computer-implemented method of claim 9, wherein data populating the first benefit completeness graph is copied from data contained within a second benefit completeness graph for a current or past benefit qualification year.

11. The computer-implemented method of claim 1, wherein at least some of the data populating the first benefit completeness graph is manually entered by the user.

12. The computer-implemented method of claim 1, wherein the first benefit completeness graph and the second benefit completeness graph each comprise respective subgraphs of larger corresponding benefit completeness graphs.

13. The computer-implemented method of claim 12, wherein each node of the first benefit completeness graph and the second benefit completeness graph comprise a common benefit concept.

14. The computer-implemented method of claim 1, wherein the textual explanation further comprises numerical information.

15. The computer-implemented method of claim 1, wherein the textual explanation comprises a summary of a plurality of benefit programs.

16. The computer-implemented method of claim 15, wherein each benefit program in the plurality of benefit programs corresponds to a respective benefit qualification status change.

17. The computer-implemented method of claim 16, wherein each benefit program in the plurality of benefit programs corresponds to a respective benefit qualification status change between a benefit qualification year and an immediately preceding benefit qualification year.

18. The computer-implemented method of claim 15, wherein the summary comprises a number corresponding to the node(s) resulting in the benefit qualification status change.

19. The computer-implemented method of claim 15, wherein the summary comprises information regarding a node resulting in the benefit qualification status change.

20. The computer-implemented method of claim 1, further comprising the first benefit completeness graph corresponding to a first decision table and the second benefit completeness graph corresponding to a second decision table,
wherein the first decision table comprises one or more rows representing a benefit qualification rule for the first benefit qualification period, each row corresponding to how the rule is satisfied based at least in part on one or more answers stored in a first set of columns in the first decision table, and wherein an answer to a question stored in a row eliminates one or more rules from consideration for a current user, and
wherein the second decision table comprises one or more rows representing a benefit qualification rule for the second benefit qualification period, each row corresponding to how the rule is satisfied based at least in part on one or more answers stored in a second set of columns in the second decision table, and wherein an answer to a question stored in a row eliminates one or more rules from consideration for the current user.

21. A system for generating an explanation for a benefit qualification status change over different benefit qualification periods, the system comprising:
a computing device having a benefit calculation engine and an explanation engine running thereon,
the computing device executing the benefit calculation engine, the benefit calculation engine operating on a first benefit completeness graph from a first benefit qualification period to perform a first benefit qualification status determination, the benefit calculation engine operating on a second benefit completeness graph from a second benefit qualification period and different in at least one respect from the first benefit completeness graph to perform a second benefit qualification status determination, the first and second benefit completeness graphs each comprising rules and regulations of its respective benefit qualification period implemented as data dependent benefit qualification operations comprising a plurality of interconnecting functional nodes connected by one of a plurality of functions,
the computing device executing the benefit calculation engine to identify differences among nodes within the first benefit completeness graph and the second benefit completeness graph,
the computing device executing the explanation engine to generate a textual explanation for a difference between the first benefit qualification status determination and the second benefit qualification status determination based one or more differences among the nodes,
the computing device presenting the textual explanation identifying the difference between the first benefit qualification status determination and the second benefit qualification status determination based one or more differences among the nodes to a user interface along with a link allowing a user to request an additional explanation, and
in response to a request for the additional explanation, the computing device recursively traversing nodes of the completeness graphs to generate a further textual explanation regarding the difference between the first benefit qualification status determination and the second benefit qualification status determination based the one or more differences among the nodes.

22. The system of claim 21, wherein the explanation engine further comprises a natural language generator for generating a natural language textual explanation.

23. The system of claim 22, wherein the natural language textual explanation is displayed on a display along with a numerical benefit calculation.

24. The system of claim 21, wherein the computing device executes the explanation engine to generate a textual explanation difference based an additional node in one of the first and second benefit completeness graphs.

25. The system of claim 21, wherein the computing device executes the explanation engine to generate a textual explanation difference based a deleted node in one of the first and second benefit completeness graphs.

26. The system of claim 21, wherein the computing device executes the explanation engine to generate a textual explanation difference based a different function associated with a node in one of the first and second benefit completeness graphs.

27. The system of claim 21, wherein the textual explanation comprises a summary of a plurality of benefit programs.

28. The system of claim 27, wherein each benefit program in the plurality of benefit programs corresponds to a respective benefit qualification status change.

29. The system of claim 28, wherein each benefit program in the plurality of benefit programs corresponds to a respective benefit qualification status change between a benefit qualification year and an immediately preceding benefit qualification year.

30. The system of claim 27, wherein the summary comprises a number corresponding to the node(s) resulting in the benefit qualification status change.

31. The system of claim 27, wherein the summary comprises information regarding a node resulting in the benefit qualification status change.

32. A computer program product comprising a non-transitory computer readable storage medium embodying one or more instructions executable by a computing device having associated benefits calculation engine and explanation engine to perform a process for generating an explanation for a benefit qualification status change over different benefit qualification periods, the process comprising the computing device executing the benefit calculation engine, the benefit calculation engine operating on a first benefit completeness graph from a first benefit qualification period to perform a first benefit qualification status determination, the benefit calculation engine operating on a second benefit completeness graph from a second benefit qualification period and different in at least one respect from the first benefit completeness graph to perform a second benefit qualification status determination, the first and second benefit completeness graphs each comprising rules and regulations of its respective benefit qualification period implemented as data dependent benefit qualification operations comprising a plurality of interconnecting functional nodes connected by one of a plurality of functions, the computing device identifying differences among nodes within the first benefit completeness graph and the second benefit completeness graph, the computing device executing the explanation engine to generate a textual explanation identifying a difference between the first benefit qualification status determination and the second benefit qualification status determination based one or more differences among the nodes, the computing device presenting the textual explanation identifying the difference between the first benefit qualification status determination and the second benefit qualification status determination based one or more differences among the nodes to a user interface along with a link allowing a user to request an additional explanation, and in response to a request for the additional explanation, the computing device recursively traversing nodes of the completeness graphs to generate a further textual explanation regarding the difference between the first benefit qualification status determination and the second benefit qualification status determination based the one or more differences among the nodes.

* * * * *